US012322345B2

(12) United States Patent
Kim et al.

(10) Patent No.: US 12,322,345 B2
(45) **Date of Patent: *Jun. 3, 2025**

(54) DISPLAY DEVICE

(71) Applicant: SAMSUNG DISPLAY CO., LTD., Yongin-si (KR)

(72) Inventors: Byung Sun Kim, Yongin-si (KR); Sun Ja Kwon, Yongin-si (KR); Yang Wan Kim, Yongin-si (KR); Hyun Ae Park, Yongin-si (KR); Su Jin Lee, Yongin-si (KR); Jae Yong Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,809

(22) Filed: Sep. 15, 2023

(65) Prior Publication Data

US 2024/0046883 A1 Feb. 8, 2024

Related U.S. Application Data

(63) Continuation of application No. 17/956,951, filed on Sep. 30, 2022, now Pat. No. 11,763,753, which is a (Continued)

(30) Foreign Application Priority Data

Feb. 29, 2016 (KR) ........................ 10-2016-0024724
May 20, 2016 (KR) ........................ 10-2016-0062319

(51) Int. Cl.
*G09G 3/3266* (2016.01)
*G09G 3/00* (2006.01)
(Continued)

(52) U.S. Cl.
CPC ............. *G09G 3/3266* (2013.01); *G09G 3/00* (2013.01); *G09G 3/3208* (2013.01); (Continued)

(58) Field of Classification Search
CPC ...... G09G 3/00; G09G 3/3208; G09G 3/3225; G09G 3/3233; G09G 3/3266; (Continued)

(56) References Cited

U.S. PATENT DOCUMENTS 7,365,714 B2 4/2008 Yoo
9,311,842 B2 4/2016 Baek et al.
(Continued)

FOREIGN PATENT DOCUMENTS

EP 3057084 8/2016
KR 10-0476368 3/2005
(Continued)

OTHER PUBLICATIONS

European Search Report dated Oct. 16, 2017 corresponding to European Patent Application No. 17158526.8.

*Primary Examiner* — Jimmy H Nguyen
(74) *Attorney, Agent, or Firm* — F. CHAU & ASSOCIATES, LLC

(57) ABSTRACT

A display device includes a substrate including a first pixel area and a second pixel area, wherein the second pixel area is located at a side of the first pixel area, first pixels located in the first pixel area and connected to first scan lines, and second pixels located in the second pixel area and connected to second scan lines, wherein the first pixels and the second pixels include pixel rows extending in a first direction, and at least one of the second scan lines is inclined with respect to the first direction.

10 Claims, 12 Drawing Sheets

Related U.S. Application Data continuation of application No. 15/406,927, filed on Jan. 16, 2017, now Pat. No. 11,482,176.

(51) Int. Cl.
*G09G 3/3208* (2016.01)
*G09G 3/3233* (2016.01)

(52) U.S. Cl.
CPC ....... *G09G 3/3233* (2013.01); *G09G 2300/04* (2013.01); *G09G 2300/0408* (2013.01); *G09G 2300/0426* (2013.01); *G09G 2300/0842* (2013.01); *G09G 2300/0861* (2013.01); *G09G 2310/0202* (2013.01); *G09G 2310/0232* (2013.01); *G09G 2310/0262* (2013.01); *G09G 2310/0281* (2013.01); *G09G 2310/0286* (2013.01); *G09G 2320/0223* (2013.01)

(58) Field of Classification Search
CPC .. G09G 3/3666; G09G 3/3677; G09G 3/3674; G09G 3/3681; G09G 2300/0426; G09G 2300/0842; G09G 2300/04; G09G 2300/0408; G09G 2300/0861; G09G 2310/0202; G09G 2310/0262; G09G 2310/0232; G09G 2310/0281; G09G 2310/0286; G09G 2320/0223; G09G 2380/02; G02F 1/134309; G02F 1/136286; G02F 1/13454; G02F 1/1368; G02F 2201/56
USPC ....................... 345/76–83, 98–100, 103, 211
See application file for complete search history.

(56) References Cited

U.S. PATENT DOCUMENTS

| | | | | |
|---|---|---|---|---|
| 11,482,176 | B2 | 10/2022 | Kim et al. | |
| 11,763,753 | B2 * | 9/2023 | Kim ......................... | G09G 3/00 345/211 |
| 2008/0266210 | A1 | 10/2008 | Nonaka | |
| 2009/0102758 | A1 | 4/2009 | Anzai et al. | |
| 2010/0156945 | A1 | 6/2010 | Yoshida | |
| 2013/0050157 | A1 | 2/2013 | Baek et al. | |
| 2013/0335397 | A1 | 12/2013 | Kim | |
| 2014/0253419 | A1 | 9/2014 | Tanada | |
| 2016/0027380 | A1 | 1/2016 | Kim et al. | |
| 2016/0190166 | A1 | 6/2016 | Kim et al. | |
| 2016/0240141 | A1 | 8/2016 | Lee et al. | |
| 2016/0351107 | A1 | 12/2016 | Chen et al. | |
| 2017/0249905 | A1 | 8/2017 | Kim et al. | |
| 2023/0023507 | A1 | 1/2023 | Kim et al. | |

FOREIGN PATENT DOCUMENTS

| | | |
|---|---|---|
| KR | 10-2013-0021699 | 3/2013 |
| KR | 1020160021060 | 2/2016 |

* cited by examiner

DISPLAY DEVICE

CROSS-REFERENCE TO RELATED APPLICATIONS

This application is a continuation of U.S. patent application Ser. No. 17/956,951 filed on Sep. 30, 2022, which is a continuation of U.S. patent application Ser. No. 15/406,927 filed on Jan. 16, 2017, now U.S. Pat. No. 11,482,176, which claims priority under 35 U.S.C. § 119 to Korean Patent Application No. 110-2016-0024724, filed on Feb. 29, 2016, in the Korean Intellectual Property Office and Korean Patent Application No. 10-2016-0062319, filed on May 20, 2016, in the Korean Intellectual Property Office, the disclosures of which are incorporated by reference herein in their entireties.

TECHNICAL FIELD

Exemplary embodiments of the present invention relate to a display device.

DESCRIPTION OF THE RELATED ART

A display device such as an organic light emitting device may include two electrodes and an organic light emitting layer interposed between the two electrodes. Electrons injected from one electrode and holes injected from the other electrode may be combined to form excitons. The organic light emitting device may emit light when the excitons discharge energy.

An organic light emitting device may also include a plurality of pixels, each pixel including an organic light emitting diode. Each of the pixels may include wiring lines and a plurality of thin film transistors connected to the wiring lines to drive the pixel's organic light emitting diode.

An organic light emitting device may further include a scan driver, a light emitting driver and a data driver. When these drivers are mounted onto a panel, a dead space of the panel may be increased.

SUMMARY

According to an exemplary embodiment of the present invention, a display device may include a substrate including a first pixel area and a second pixel area, wherein the second pixel area is located at a side of the first pixel area, first pixels located in the first pixel area and connected to first scan lines, and second pixels located in the second pixel area and connected to second scan lines, wherein the first pixels and the second pixels include pixel rows extending in a first direction, and at least one of the second scan lines is inclined with respect to the first direction.

The substrate may further include a first peripheral area located outside the first pixel area, a second peripheral area located outside the second pixel area, first scan stages located in the first peripheral area and connected to the first scan lines, and second scan stages located in the second peripheral area and connected to the second scan lines.

The first scan lines may extend from output terminals of the first scan stages in parallel with the first direction.

The second peripheral area may have a curved shape.

A number of pixels provided in pixel rows arranged in the second pixel area may be smaller than a number of pixels provided in pixel rows arranged in the first pixel area.

Pixel rows distant from the first pixel area, among the pixel rows arranged in the second pixel area, may include a smaller number of pixels.

The second pixel area may have a smaller area than the first pixel area and a corner portion of the second pixel area has a curved shape.

A position of a second scan stage output terminal along a second direction crossing the first direction may be different from a position of a scan signal input terminal of each of the second pixels connected to the second scan stage through a corresponding second scan line.

According to an exemplary embodiment of the present invention, a display device may include a substrate including a first pixel area and a second pixel area, wherein the second pixel area is located at a side of the first pixel area, first pixels located in the first pixel area and connected to first scan lines, and second pixels located in the second pixel area and connected to second scan lines, wherein first pixel rows in which the first pixels are arranged extend in a first direction and are located in the first pixel area and second pixel rows in which the second pixels are arranged extend in the first direction and are located in the second pixel area, and lengths of second scan lines connected to outermost second pixels in the second pixel rows are greater than lengths of first scan lines connected to outermost first pixels in the first pixel rows.

The lengths of the second scan lines connected to the outermost second pixels in the second pixel rows may increase as the second pixel rows get farther from the first pixel area.

The second pixel area may have a smaller area than the first pixel area and may have a corner portion with a curved shape.

Pixel columns in which the first pixels and the second pixels are arranged in a second direction crossing the first direction may be located in the first pixel area and the second pixel area, and data lines extending in the second direction may be connected to each of the pixel columns.

The substrate may further include a first peripheral area located outside the first pixel area, a second peripheral area located outside the second pixel area, first scan stages located in the first peripheral area and connected to the first scan lines, and second scan stages located in the second peripheral area and connected to the second scan lines.

The second peripheral area may have a curved shape.

Overlapping areas between the second scan lines and the data lines may be formed in a region between the second scan stages and the second pixels.

A plurality of first overlapping areas may be formed between a first second scan line of the second scan lines and the data lines, a plurality of second overlapping areas may be formed between a second second scan line of the second scan lines and the data lines, and the first second scan line may be closer to the first pixel area than the second second scan line.

A sum of areas of the second overlapping areas may be greater than a sum of areas of the first overlapping areas.

A number of the first overlapping areas may be smaller than a number of the second overlapping areas.

According to an exemplary embodiment of the present invention, a display device may include: a substrate including a first pixel area and a second pixel area, wherein the second pixel area is adjacent to the first pixel area, wherein a corner of the second pixel area has a curved shape; the substrate further including a first peripheral area adjacent to the second pixel area and having a curved shape, wherein the first peripheral area includes a plurality of scan drivers, and the second pixel area includes a plurality of pixels arranged in pixel rows, wherein a distance from a scan driver adjacent to the first pixel area to a corresponding pixel is less than a distance from a scan driver farther away from the first pixel area to a corresponding pixel.

An amount of overlap between a signal line and a data line in the second pixel area is greater proceeding away from the first pixel area.

BRIEF DESCRIPTION OF THE DRAWINGS

The above and other features of the present invention will become more apparent by describing in detail exemplary embodiments thereof with reference to the accompanying drawings.

DETAILED DESCRIPTION OF THE EMBODIMENTS

Figure 1:
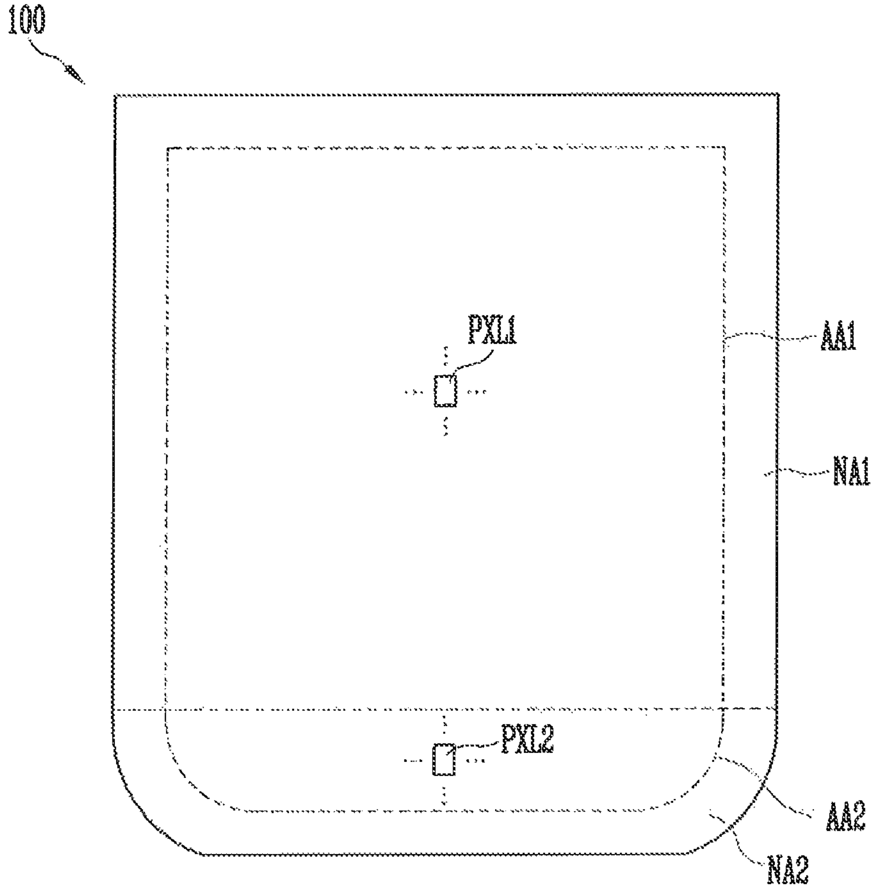
FIG. 1 is a diagram illustrating a substrate according to an exemplary embodiment of the present invention.

The present invention will now be described more fully with reference to the accompanying drawings, in which exemplary embodiments of the invention are shown.

When an element, such as a layer, a film, a region or a plate, is referred to as being "on" another element, it can be directly on the another element or be on the another element with one or more intervening elements interposed therebetween. In the drawings, like reference numbers may refer to like components.

Hereinafter, an organic light emitting display device according to exemplary embodiments of the present invention will be described in detail with reference to the accompanying drawings.

According to an exemplary embodiment of the present invention, a display device capable of minimizing dead space is provided.

FIG. 1 is a diagram illustrating a substrate 100 according to an exemplary embodiment of the present invention.

Referring to FIG. 1, the substrate 100 may include pixel areas AA1 and AA2 and peripheral areas NA1 and NA2.

A plurality of pixels PXL1 and PXL2 may be located in the pixel areas AA1 and AA2 so that an image may be displayed on the pixel areas AA1 and AA2. Therefore, the pixel areas AA1 and AA2 may be referred to as a display area.

Components, such as drivers or wiring lines, for driving the pixels PXL1 and PXL2 may be located in the peripheral areas NA1 and NA2. Since the pixels PXL1 and PXL2 are not present in the peripheral areas NA1 and NA2, the peripheral areas NA1 and NA2 may be referred to as a non-display area.

For example, the peripheral areas NA1 and NA2 may exist on the outside of the pixel areas AA1 and AA2 and surround at least portions of the pixel areas AA1 and AA2.

The pixel areas AA1 and AA2 may include a first pixel area AA1 and a second pixel area AA2 located at one side of the first pixel area AA1.

The first pixel area AA1 may have a greater area than the second area AA2.

The peripheral areas NA1 and NA2 may include a first peripheral area NA1 and a second peripheral area NA2.

The first peripheral area NA1 may be near the first pixel area AA1 and surround at least a portion of the first pixel area AA1.

The second peripheral area NA2 may be near the second pixel area AA2 and surround at least a portion of the second pixel area AA2.

The pixels PXL1 and PXL2 may include first pixels PXL1 and second pixels PXL2.

For example, the first pixels PXL1 may be located in the first pixel area AA1, and the second pixels PXL2 may be located in the second pixel area AA2.

The pixels PXL1 and PXL2 may emit light with a predetermined brightness in response to control of drivers located in the peripheral areas NA1 and NA2. The pixels PXL1 and PXL2 may include organic light emitting diodes.

The substrate 100 may have various shapes such that the above-described pixel areas AA1 and AA2 and peripheral areas NA1 and NA2 may be set.

For example, as illustrated in FIG. 1, the substrate 100 may include two square corners and two rounded corners.

However, the present invention is not limited thereto. In other words, the substrate 100 may include four rounded corners such that upper rounded corners and lower rounded corners may have different curvatures.

As illustrated in FIG. 1, a lower corner portion of the substrate 100 which corresponds to the second peripheral area NA2 and the second pixel area AA2 may have a curved shape with a predetermined curvature. However, the lower corner portion of the substrate 100 may also have various shapes such as an angular shape.

When corner portions of the second pixel area AA2 and the second peripheral area NA2 are curved, the second pixels PXL2 located in the second pixel area AA2 may be arranged in a different manner from the first pixels PXL1 located in the first pixel area AA1. The arrangement of the second pixels PXL2 will be described below.

The substrate 100 may include an insulating material such as glass or resin. In addition, the substrate 100 may include a material with flexibility so that the substrate 100 may be bent or folded. The substrate 100 may have a single layer structure or a multilayer structure.

For example, the substrate 100 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the substrate 100 may include various materials in addition to the above materials. For example, the substrate 100 may include fiber glass reinforced plastic (FRP).

Figure 2:
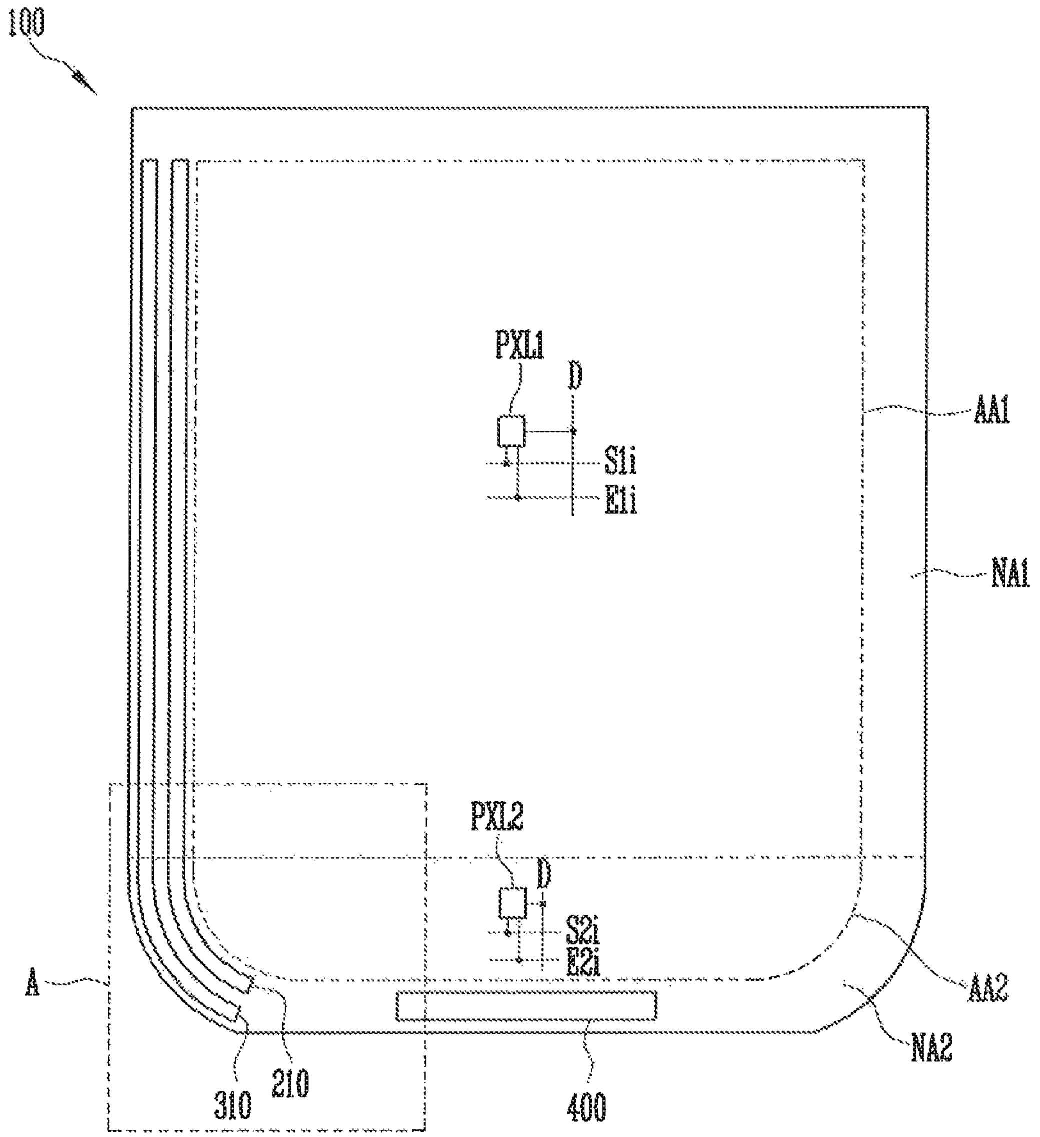
FIG. 2 is a diagram illustrating an organic light emitting device according to an exemplary embodiment of the present invention.

FIG. 2 is a diagram illustrating an organic light emitting display device according to an exemplary embodiment of the present invention.

Referring to FIG. 2, an organic light emitting display device according to an exemplary embodiment of the present invention may include the substrate 100, the first pixels PXL1, the second pixels PXL2, a scan driver 210, a light emitting driver 310, and a data driver 400.

The first pixels PXL1 may be located in the first pixel area AA1. Each of the first pixels PXL1 may be connected to a first scan line S1*i*, a first light emission control line E1*i*, and a data line D.

The second pixels PXL2 may be located in the second pixel area AA2. Each of the second pixels PXL2 may be connected to a second scan line S2*i*, a second light emission control line E1*i*, and the data line D. Here, i is a natural number. For example, reference character S1*i* may refer to an ith first scan line, among plural first scan lines.

The scan driver 210 may supply scan signals to first scan lines S1*i* and second scan lines S2*i*. In other words, the scan driver 210 may drive the first pixels PXL1 and the second pixels PXL2. The scan driver 210 may be located in the first peripheral area NA1 and the second peripheral area NA2.

The scan driver 210 may have a curved shape in the second peripheral area NA2 to correspond to the shape of the corner portion of the second peripheral area NA2 where it is disposed.

The light emitting driver 310 may supply a light emission control signal to the first light emission control line E1*i* and the second light emission control line E2*i*. In other words, the light emitting driver 310 may drive the first pixels PXL1 and the second pixels PXL2. The light emitting driver 310 may be located in the first peripheral area NA1 and the second peripheral area NA2.

The light emitting driver 310 may have a curved shape in the second peripheral area NA to correspond to the shape of the corner portion of the second peripheral area NA2 where it is disposed.

In addition, FIG. 2 illustrates the light emitting driver 310 may be located separate the scan driver 210. However, the present invention is not limited thereto. For example, the light emitting driver 310 may be combined with the scan driver 210 in a singular device.

The data driver 400 may supply data signals to the first and second pixels PXL1 and PXL2 through the data lines D.

In FIG. 2, a timing controller configured to supply predetermined control signals to the scan driver 210, the light emitting driver 310, and the data driver 400 may further be included.

Figure 3:
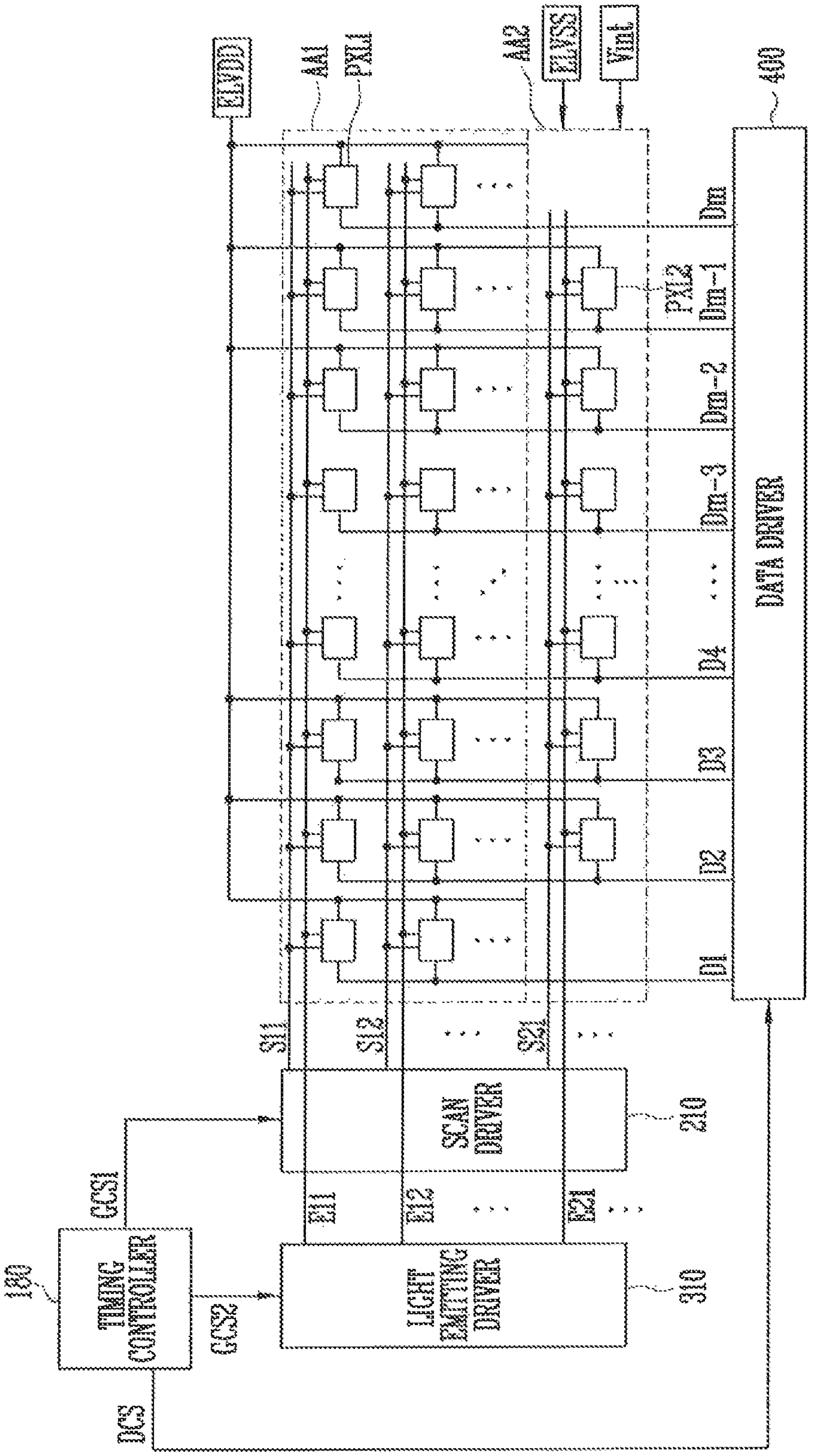
FIG. 3 is a diagram illustrating an organic light emitting device according to an exemplary embodiment of the present invention.

FIG. 3 is a detailed diagram illustrating an organic light emitting display device according to an exemplary embodiment of the present inventive concept.

Referring to FIG. 3, an organic light-emitting display device according to an exemplary embodiment of the present invention may include the scan driver 210, the light emitting driver 310, the data driver 400, a timing controller 180, the first pixels PXL1, and the second pixels PXL2.

The first pixels PXL1 may be located in the first pixel area AA1 divided by first scan lines S11, S12, . . . , first light emission control lines E11, E21, . . . , and data lines D1 to Dm. The first pixels PXL1 may receive data signals from the data lines D1 to Dm when scan signals are supplied from the first scan lines S11, S12, . . . . The first pixels PXL1 receiving the data signals may control the amount of current flowing from a first power supply ELVDD to a second power supply ELVSS via an organic light emitting diode.

The second pixels PXL2 may be located in the second pixel area AA2 divided by second scan lines S21, . . . , second light emission control lines E21, . . . , and the data lines D1 to Dm. The second pixels PXL2 may receive data signals from the data lines D1 to Dm when scan signals are supplied from the second scan lines S21, . . . . The second pixels PXL2 receiving the data signals may control the amount of current flowing from the first power supply ELVDD to the second power supply ELVSS via the organic light emitting diode.

For convenience of explanation, FIG. 3 illustrates the second pixels PXL2 arranged in a single pixel row. However, the present invention is not limited thereto. For example, the second pixels PXL2 may be arranged in different rows, so that a plurality of the second scan lines S2*i* and a plurality of the second light emission control lines E2*i* may be formed.

The scan driver 210 may supply scan signals to the first scan lines S11, S12, . . . , and the second scan lines S21, . . . in response to a first gate control signal GCS1 from the timing controller 180. For example, the scan driver 210 may sequentially supply scan signals to the first scan lines S11, S12, . . . , and the second scan lines S21, . . . . When the scan signals are sequentially supplied to the first scan lines S11, S12, . . . , and the second scan lines S21, . . . , the first pixels PXL1 and the second pixels PXL2 may be sequentially selected in units of horizontal lines. The scan driver 210 may be mounted onto the substrate 100 through a thin film process. In addition, the scan driver 210 may be mounted on both sides of the substrate 100 with the first pixel area AA1 and the second pixel area AA2 interposed therebetween.

The light emitting driver 310 may supply light emission control signals to the first light emission control lines E11, E12, . . . and the second light emission control lines E21, . . . in response to a second gate control signal GCS2 from the timing controller 180. For example, the light emitting driver 310 may sequentially supply the light emission control signals to the first light emission control lines E11, E12, . . . and the second light emission control lines E21, . . . . The light emission control signals may be used to control light emission times of the pixels PXL. PXL may be used to refer to at least one of the pixels PXL1 and PXL2. A light emission control signal may be set to have a greater width than a scan signal.

The light emission control signals may be set to a gate off voltage (e.g., a high voltage) so that transistors included in the pixels PXL1 and PXL2 may be turned off, and the scan signals may be set to a gate on voltage (e.g., a low voltage) so that the transistors included in the pixels PXL1 and PXL2 may be turned on.

The data driver 400 may supply data signals to the data lines D1 to Dm in response to a data control signal DCS. The data signals supplied to the data lines D1 to Dm may be supplied to the pixels PXL1 and PXL2 selected by the scan signals. FIG. 3 illustrates the data driver 400 located below the first pixel area AA1. However, the present invention is not limited thereto. For example, the data driver 400 may be located above the first pixel area AA1.

The timing controller 180 may supply the gate control signals GCS1 and GCS2, which are generated on the basis of externally supplied timing signals, to the scan driver 210 and the light emitting driver 310, and supply the data control signal DCS to the data driver 400.

Each of the gate control signals GCS1 and GCS2 may include a start pulse and clock signals. The start pulse may control the timing of the first scan signal or the first light emission control signal. The clock signals may be used to shift the start pulse.

The data control signal DCS may include a source start pulse and clock signals. The source start pulse may control a sampling start point of data. The clock signals may be used to control a sampling operation.

Figure 4:
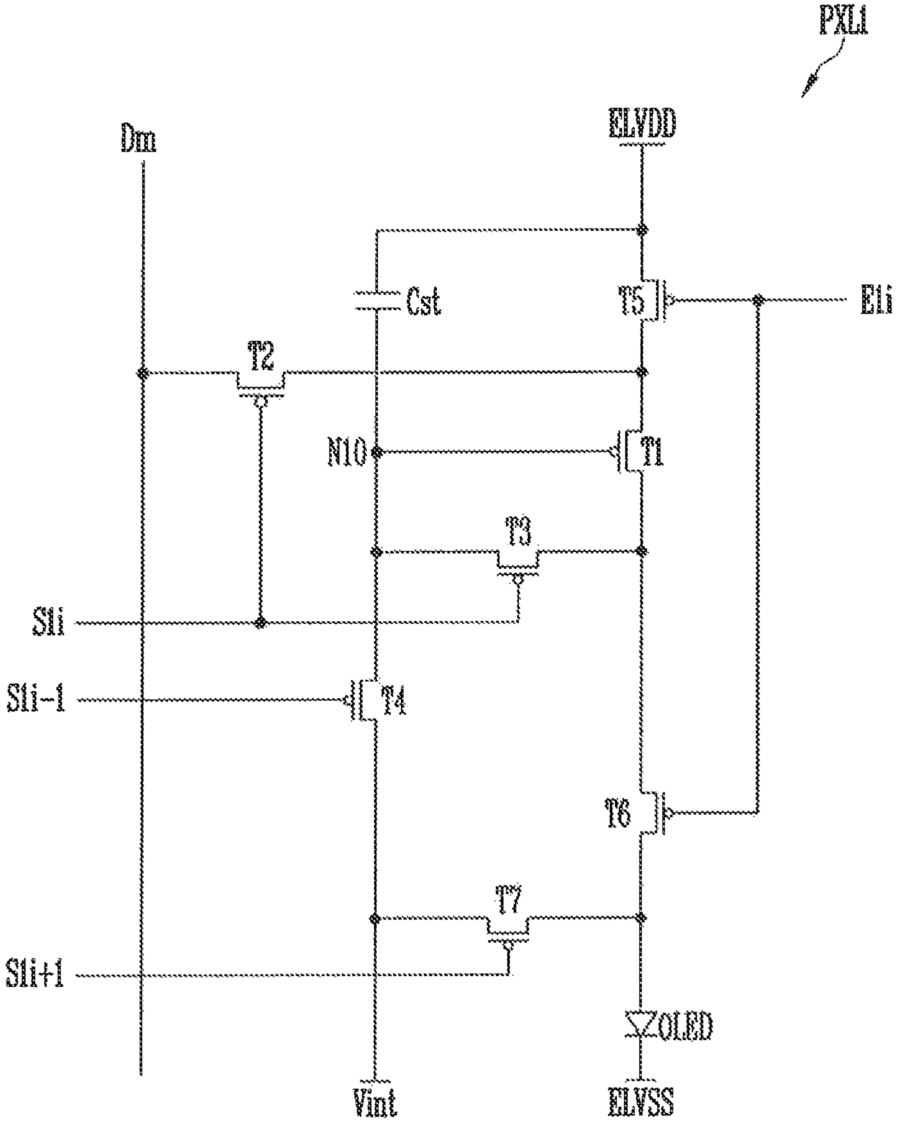
FIG. 4 is a diagram illustrating a first pixel shown in FIG. 3 according to an exemplary embodiment of the present invention.

FIG. 4 is a diagram illustrating a first pixel shown in FIG. 3 according to an exemplary embodiment of the present invention. For convenience of explanation, FIG. 4 illustrates a first pixel coupled to an mth data line Dm and the ith first scan line S1*i*.

Referring to FIG. 4, the first pixel PXL1 may include an organic light emitting diode OLED, first to seventh transistors T1 to T7, and a storage capacitor Cst.

An anode of the organic light emitting diode OLED may be coupled to the first transistor T1 through the sixth transistor T6, and a cathode thereof may be coupled to the second power supply ELVSS. The organic light emitting diode OLED may generate light with a predetermined brightness in response to the amount of current supplied from the first transistor T1.

The first power supply ELVDD may be set to a greater voltage than the second power supply ELVSS so that a current may flow through the organic light emitting diode OLED.

The seventh transistor T7 may be coupled between an initialization power supply Vint and the anode of the organic light emitting diode OLED. In addition, a gate electrode of the seventh transistor T7 may be coupled to an (i+)th first scan line S1*i*+1. The seventh transistor T7 may be turned on when a scan signal is supplied to the (i+1)th first scan line S1*i*+1 to supply a voltage of the initialization power supply Vint to the organic light emitting diode OLED. The initialization power supply Vint may be set to have a lower voltage than a data signal.

The sixth transistor T6 may be coupled between the first transistor T1 and the organic light emitting diode OLED. In addition, a gate electrode of the sixth transistor 16 may be coupled to the ith first light emission control line E1*i*. The sixth transistor T6 may be turned off when a light emission control signal is supplied to the ith first light emission control line E1*i*, and may be turned on when the light emission control signal is not supplied to the ith first light emission control line E1*i*.

The fifth transistor T5 may be coupled between the first power supply ELVDD and the first transistor T1. In addition, a gate electrode of the fifth transistor T5 may be coupled to the ith first light emission control line E1*i*. The fifth transistor T5 may be turned off when the light emission control signal is supplied to the ith first light emission control line E1*i*, and may be turned on when the light emission control signal is not supplied to the ith first light emission control lane E1*i*.

A first electrode of the first transistor T1 (e.g., a driving transistor) may be coupled to the first power supply ELVDD through the fifth transistor T5, and a second electrode of the first transistor T1 may be coupled to the anode of the organic light emitting diode OLED via the sixth transistor T6. In addition, the gate electrode of the first transistor T1 may be coupled to a tenth node N10. The first transistor T1 may control the amount of current flowing from the first power supply ELVDD to the second power supply ELVSS via the organic light emitting diode OLED in response to a voltage of the tenth node N10.

The third transistor T3 may be coupled between the second electrode of the first transistor T1 and the tenth node N10. In addition, a gate electrode of the third transistor T3 may be coupled to the ith first scan line S1*i*. The third transistor T3 may be turned on when the scan signal is supplied to the ith first scan line S1*i* to electrically connect the second electrode of the first transistor T1 to the tenth node N10. Therefore, when the third transistor T3 is turned on, the first transistor T1 may be connected in the form of a diode.

The fourth transistor T4 may be coupled between the tenth node N10 and the initialization power supply Vint. In addition, a gate electrode of the fourth transistor T4 may be coupled to the (i−1)th first scan line S1*i*−1. The fourth transistor T4 may be turned on when a scan signal is supplied to the (i−1)th first scan line S1*i*−1 to supply a voltage of the initialization power supply Vint to the tenth node N10.

The second transistor T2 may be coupled between the mth data line Dm and the first electrode of the first transistor T1. In addition, a gate electrode of the second transistor T2 may be coupled to the ith first scan line S1*i*. When the scan signal is supplied to the ith first scan line S1*i*, the second transistor T2 may be turned on to electrically connect the mth data line Dm to the first electrode of the first transistor T1.

The storage capacitor Cst may be coupled between the first power supply ELVDD and the tenth node N10. The storage capacitor Cst may store voltages corresponding to a data signal and a threshold voltage of the first transistor T1.

The second pixel PXL2 may have substantially the same circuit configuration as the first pixel PXL1. Therefore, a detailed description of the second pixel PXL2 will be omitted.

Figure 5:
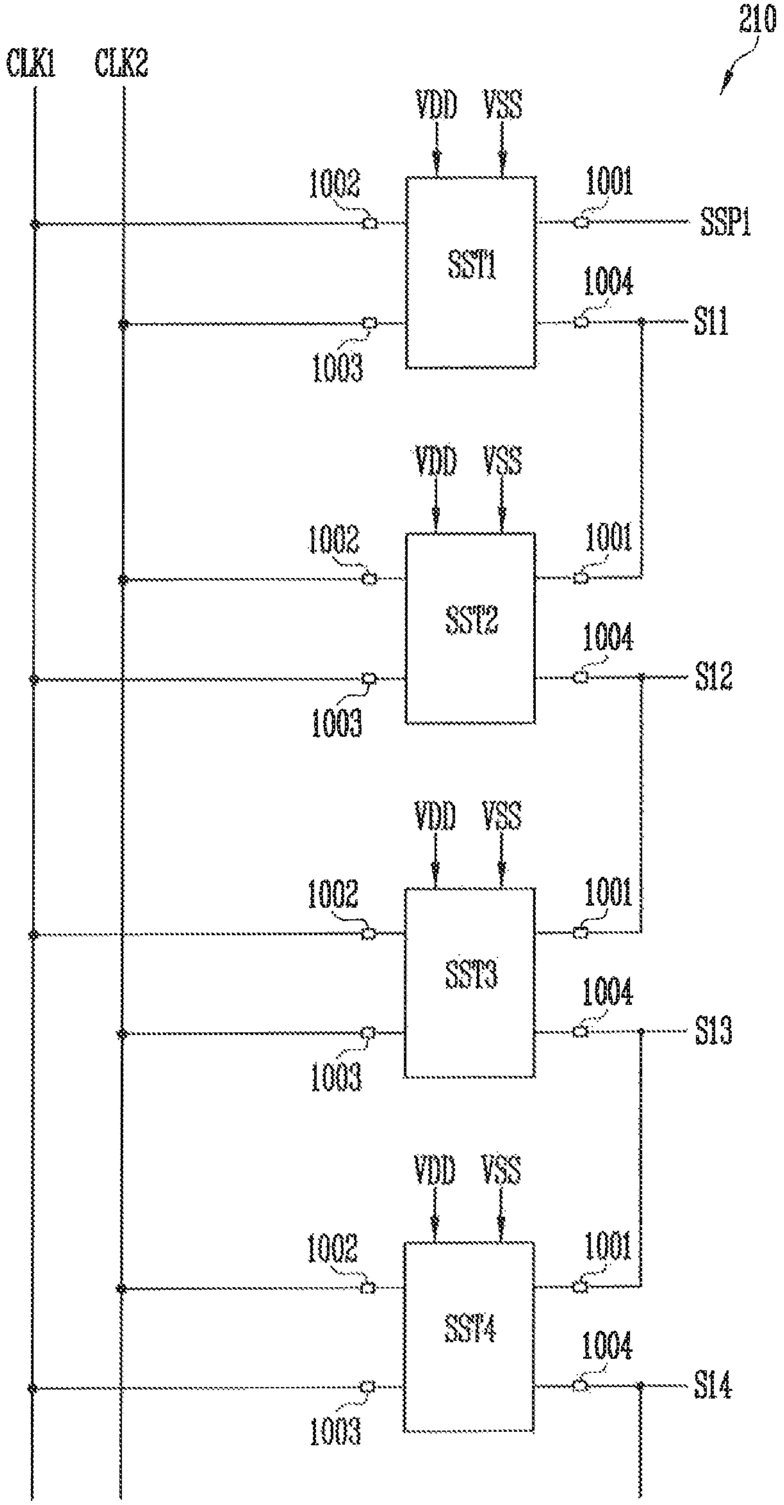
FIG. 5 is a diagram illustrating a driver according to an exemplary embodiment of the present invention.

FIG. 5 is a diagram illustrating a scan driver according to an exemplary embodiment of the present invention. For convenience of explanation, FIG. 5 illustrates four scan stages.

Referring to FIG. 5, the scan driver 210 according to an exemplary embodiment of the present invention may include a plurality of scan stages SST1 to SST4. Each of the scan stages SST1 to SST4 may be connected to one of the first scan lines S11 to S14 and be driven in response to first and second clock signals CLK1 and CLK2. The scan stages SST1 to SST4 may have the same circuit configuration.

Each of the scan stages SST1 to SST4 may include first to third input terminals 1001 to 1003 and an output terminal 1004.

The first input terminal 1001 of each of the scan stages SST1 to SST4 may receive an output signal (e.g., a scan signal) from a previous scan stage, or a first start pulse SSP1. For example, the first input terminal 1001 of the first scan stage SST1 may receive the first start pulse SSP1, and the first input terminal 1001 of each of the scan stages SST2 to SST4 may receive an output signal from a previous scan stage.

The second input terminal 1002 of a jth scan stage SSTj may receive the first clock signal CLK1, where j is an odd or even number. The third input terminal 1003 of the jth scan stage SSTj may receive the second clock signal CLK2. The second input terminal 1002 of a (j+1)th scan stage SSTj+1 may receive the second clock signal CLK2, and the third input terminal 1003 of the (j+1)th scan stage SSTj+1 may receive the first clock signal CLK1.

The first clock signal CLK1 and the second clock signal CLK2 may have the same period and phases as each other may not overlap with each other. For example, when a period during which a scan signal is supplied to the first scan line S1*i* is a single horizontal period 1H, the clock signals CLK1 and CLK2 may each have a period of 2H and be supplied during different horizontal periods.

In addition, each of the scan stages SST1 to SST4 may receive a first power supply VDD and a second power supply VSS. The first power supply VDD may be set to a gate off voltage, e.g., a high voltage, and the second power supply VSS may be set to a gate on voltage, e.g., a low voltage.

Figure 6:
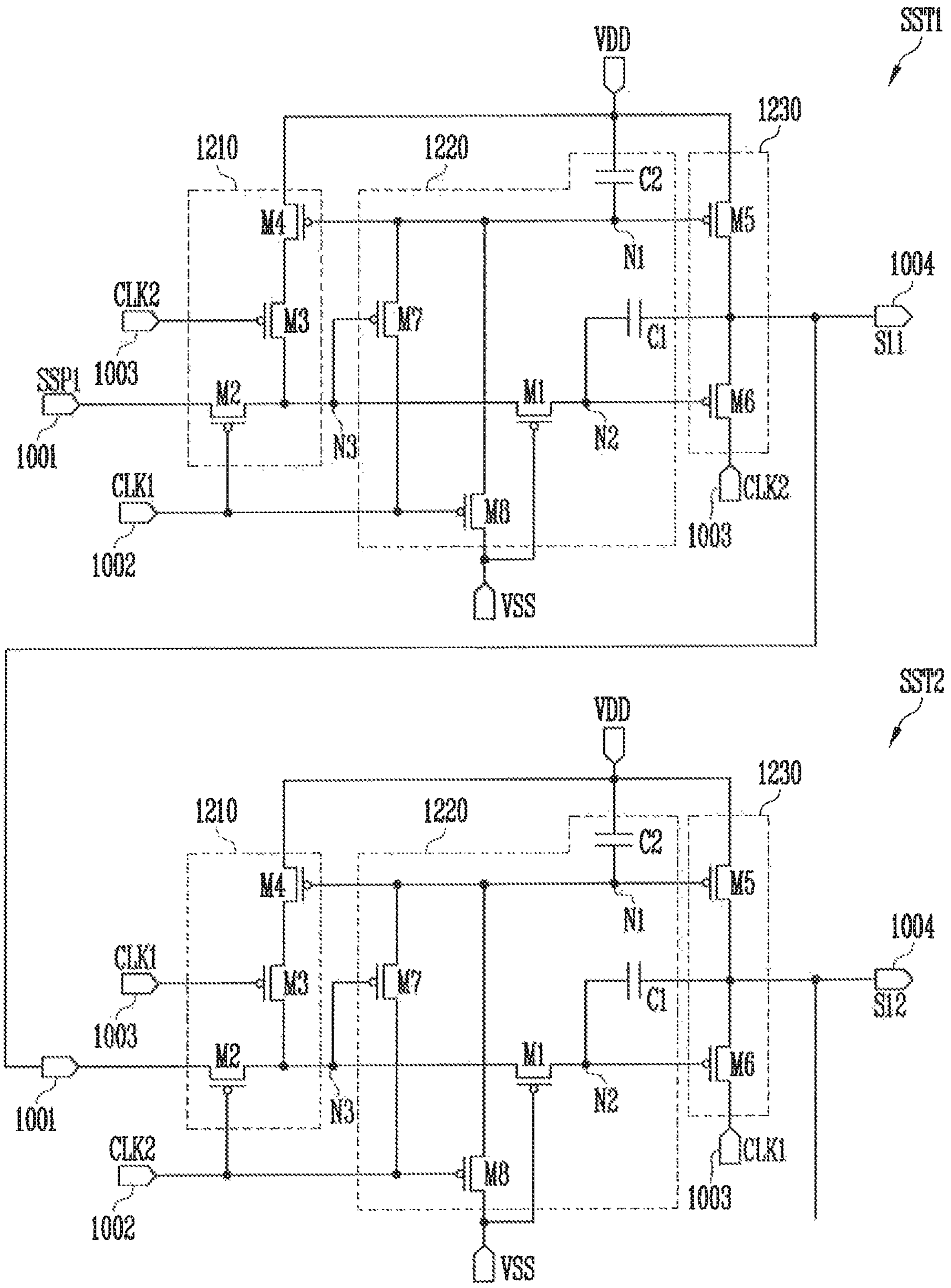
FIG. 6 is a circuit diagram illustrating scan stages shown in FIG. 5 according to an exemplary embodiment of the present invention.

FIG. 6 is a circuit diagram illustrating a scan stage shown in FIG. 5 according to an exemplary embodiment of the present invention. For convenience of explanation, FIG. 6 illustrates the first scan stage SST1 and the second scan stage SST2.

Referring to FIG. 6, the first scan stage SST1 according to an exemplary embodiment of the present invention may include a first driver 1210, a second driver 1220, an output unit 1230 (or a buffer), and a first transistor M1.

The output unit 1230 may control a voltage supplied to the output terminal 1004 in response to voltages of a first node N1 and a second node N2. The output unit 1230 may include a fifth transistor M5 and a sixth transistor M6.

The fifth transistor M5 may be located between the first power supply VDD and the output terminal 1004 and have a gate electrode connected to the first node N1. The fifth transistor M5 may control the connection between the first power supply VDD and the output terminal 1004 in response to a voltage applied to the first node N1.

The sixth transistor M6 may be located between the output terminal 1004 and the third input terminal 1003 and have a gate electrode coupled to the second node N2. The sixth transistor M6 may control the connection between the output terminal 1004 and the third input terminal 1003 in response to a voltage applied to the second node N2. The output unit 1230 may be driven as a buffer. In addition, the fifth transistor M5, and/or the sixth transistor M6 may be composed of a plurality of transistors connected in parallel with each other.

The first driver 1210 may control a voltage of a third node N3 in response to signals supplied to the first to third input terminals 1001 to 1003. The first driver 1210 may include second to fourth transistors M2 to M4.

The second transistor M2 may be interposed between the first input terminal 1001 and a third node N3, and a gate electrode of the second transistor M2 may be coupled to the second input terminal 1002. The second transistor M2 may control the connection between the first input terminal 1001 and the third node N3 in response to the signals supplied to the second input terminal 1002.

The third transistor M3 and the fourth transistor M4 may be connected in series between the third node N3 and the first power supply VDD. For example, the third transistor M3 may be located between the fourth transistor M4 and the third node N3 and a gate electrode of the third transistor M3 may be coupled to the third input terminal 1003. The third transistor M3 may control the connection between the fourth transistor M4 and the third node N3 in response to the signals supplied to the third input terminal 1003.

The fourth transistor M4 may be located between the third transistor M3 and the first power supply VDD and a gate electrode of the fourth transistor M4 may be coupled to the first node N1. The fourth transistor M4 may control the connection between the third transistor M3 and the first power supply VDD in response to the voltage of the first node N1.

The second driver 1220 may control the voltage of the first node N1 in response to voltages of the second input terminal 1002 and the third node N3. The second driver 1220 may include a seventh transistor M7, an eighth transistor M8, a first capacitor C1, and a second capacitor C2.

The first capacitor C1 may be coupled between the second node N2 and the output terminal 1004. The first capacitor C1 may be charged with voltages corresponding to a turn-on state and a turn-off state of the sixth transistor M6.

The second capacitor C2 may be coupled between the first node N1 and the first power supply VDD. The second capacitor C2 may be charged with the voltage applied to the first node N1.

The seventh transistor M7 may be located between the first node N1 and the second input terminal 1002 and a gate electrode of the seventh transistor M7 may be coupled to the third node N3. The seventh transistor M7 may control the connection between the first node N1 and the second input terminal 1002 in response to the voltage of the third node N3.

The eighth transistor M8 may be located between the first node N1 and the second power supply VSS and a gate electrode of the eighth transistor M8 may be coupled to the second input terminal 1002. The eighth transistor M8 may control the connection between the first node N1 and the second power supply VSS in response to a signal from the second input terminal 1002.

The first transistor M1 may be located between the third node N3 and the second node N2 and a gate electrode of the first transistor M1 may be coupled to the second power supply VSS. The first transistor M1 may maintain a turn-on state and maintain the electrical connection between the third node N3 and the second node N2. In addition, the first transistor M1 may limit a width by which the voltage of the third node N3 is lowered in response to the voltage of the second node N2. In other words, when the voltage of the second node N2 is lowered to a voltage less than the second power supply VSS, the voltage of the third node N3 may not be reduced to a voltage obtained by subtracting a threshold voltage of the first transistor M1 from the second power supply VSS. A detailed description thereof will be described below.

Figure 7:
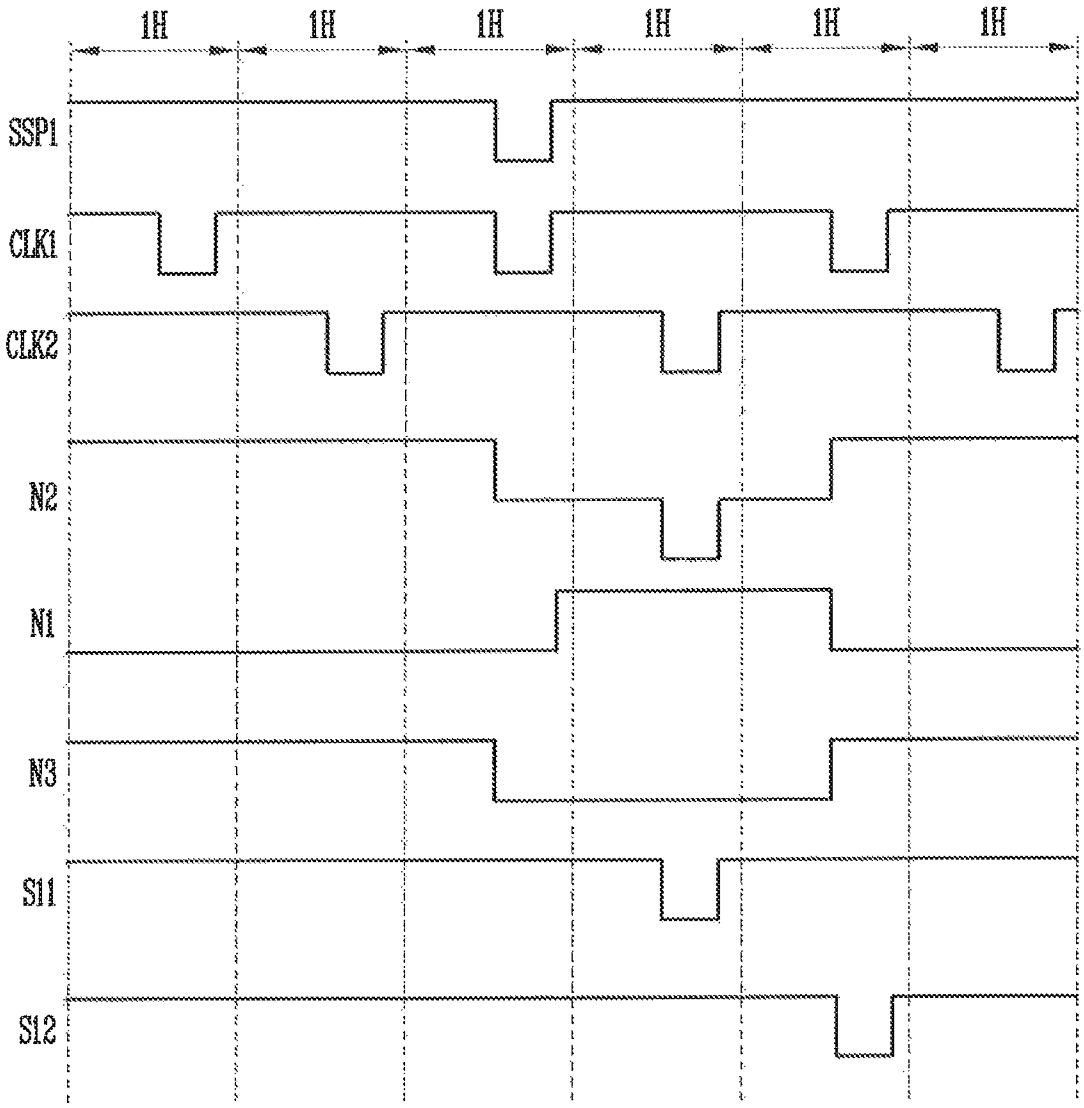
FIG. 7 is a waveform view illustrating a method of driving scan stages shown in FIG. 6 according to an exemplary embodiment of the present invention.

FIG. 7 is a waveform diagram illustrating a method of driving a scan stage shown in FIG. 6 according to an exemplary embodiment of the present invention. For convenience of explanation, FIG. 7 illustrates operations using the first scan stage SST1.

Referring to FIG. 7, each of the first clock signal CLK1 and the second clock signal CLK2 may have two horizontal periods (2H). The first and second clock signals CLK1 and CLK2 may be supplied during different horizontal periods. In other words, the second clock signal CLK2 may be set to a signal shifted by a half period, e.g., a single horizontal period, from the first clock signal CLK1. In addition, the first start pulse SSP1 supplied to the first input terminal 1001 may be supplied in synchronization with a clock signal supplied to the second input terminal 1002, e.g., the first clock signal CLK1.

In addition, when the first start pulse SSP1 is supplied, the first input terminal 1001 may be set to a voltage of the second power supply VSS. When the first start pulse SSP1 is not supplied, the first input terminal 1001 may be set to a voltage of the first power supply VDD. In addition, when the clock signal CLK is supplied to the second input terminal 1002 and the third input terminal 1003 the second input terminal 1002 and the third input terminal 1003 may be set to the voltage of the second power supply VSS. When the clock signal CLK is not supplied to the second input terminal 1002 and the third input terminal 1003, the second input terminal 1002 and the third input terminal 1003 may be set to the voltage of the first power supply VDD.

For example, the first start pulse SSP1 may be supplied in synchronization with the first clock signal CLK1.

When the first clock signal CLK1 is supplied, the second transistor M2 and the eighth transistor M8 may be turned on. When the second transistor M2 is turned on, the first input terminal 1001 and the third node N3 may be electrically connected to each other. Since the first transistor M1 is set to a turn-on state at all times, the second node N2 may maintain an electrical connection with the third node N3.

When the first input terminal 1001 and the third node N3 are electrically connected to each other, the third node N3 and the second node N2 may be set to a low voltage by the first start pulse SSP1 supplied to the first input terminal 1001. When the third node N3 and the second node N2 are set to the low voltage, the sixth transistor M6 and the seventh transistor M7 may be turned on.

When the sixth transistor M6 is turned on, the third input terminal 1003 and the output terminal 1004 may be electrically connected to each other. The third input terminal 1003 may be set to a high voltage (e.g., when the second clock signal CLK2 is not supplied to the third input terminal 1003). Therefore, the high voltage may also be output to the output terminal 1004. When the seventh transistor M7 is turned on, the second input terminal 1002 and the first node N1 may be electrically connected to each other. A voltage of the first clock signal CLK1 supplied to the second input terminal 1002, e.g., a low voltage, may be supplied to the first node N1.

In addition, when the first clock signal CLK1 is supplied, the eighth transistor M8 may be turned on. When the eighth transistor M8 is turned on, the voltage of the second power supply VSS may be supplied to the first node N1. The voltage of the second power supply VSS may be set to the same (or similar) voltage as the s clock signal CLK1, so that the first node N1 may stably maintain the low voltage.

When the first node N1 is set to the low voltage, the fourth transistor M4 and the fifth transistor M5 may be turned on. When the fourth transistor M4 is turned on, the first power supply VDD and the third transistor M3 may be electrically connected to each other. Since the third transistor M3 is set to a turn-off state, the third node N3 may stably maintain the low voltage when the fourth transistor M4 is turned on. When the fifth transistor M5 is turned on, the voltage of the first power supply VDD may be applied to the output terminal 1004. The voltage of the first power supply VDD may be set to the same voltage as the high voltage of the third input terminal 1003. Therefore, the output terminal 1004 may stably maintain the high voltage.

Subsequently, the supply of the first start pulse SSP1 and the first clock signal CLK1 may be stopped. When the supply of the first clock signal CLK1 is stopped, the second transistor M2 and the eighth transistor M8 may be turned off. The sixth transistor M6 and the seventh transistor M7 may maintain the turn-on state in response to the voltages stored in the first capacitor C1. In other words, the second node N2 and the third node N3 may maintain the low voltages by virtue of the voltages stored in the first capacitor C1.

When the sixth transistor M6 maintains the turn-on state, the output terminal 1004 and the third input terminal 1003 may maintain their electrical connection. When the seventh transistor M7 maintains the turn-on Mate, the first node N1 may maintain the electrical connection with second input terminal 1002. A voltage of the second input terminal 1002 may be set, to a high voltage in response to interruption of the supply of the first clock signal CLK1, and the first node N1 may also be set to the high voltage. When the high voltage is supplied to the first node N1, the fourth transistor M4 and the fifth transistor M5 may be turned off.

Subsequently, the second clock signal CLK2 may be supplied to the third input terminal 1003. Since the sixth transistor M6 is set to the turn-on state, the second clock signal CLK2 supplied to the third input terminal 1003 may be supplied to the output terminal 1004. The output terminal 1004 may output the second clock signal CLK2 as a scan signal to the first scan line S11.

When the second clock signal CLK2 is supplied to the output terminal 1004, the voltage of the second node N2 may be lowered to a voltage less than the second power supply VSS by coupling of the first capacitor C1, so that the sixth transistor M6 may stably maintain a turn-on state.

When the voltage of the second node N2 is lowered, the third node N3 may maintain the voltage of the second power supply VSS (e.g., the maintained voltage may be a voltage obtained by subtracting the threshold voltage of the first transistor M1 from the second power supply VSS) by virtue of the first transistor M1.

After the scan signal is output to the first scan line S11, the supply of the second clock signal CLK2 may be stopped. When the supply of the second clock signal CLK2 is stopped, the output terminal 1004 may output a high voltage. In addition, the voltage of the second node N2 may be increased to approximately the voltage of the second power supply VSS in response to the high voltage of the output terminal 1004.

Subsequently, the first clock signal CLK1 may be supplied. When the first clock signal CLK1 is supplied, the second transistor M2 and the eighth transistor M8 may be turned on. When the second transistor M2 is turned on, the first input terminal 1001 and the third node N3 may be electrically connected to each other. Since the first start pulse SSP1 is not supplied to the first input terminal 1001, the first input terminal 1001 may be set to a high voltage. Therefore, when the first transistor M1 is turned on, the high voltage may be supplied to the third node N3 and the second node N2, so that the sixth transistor M6 and the seventh transistor M7 may be turned off.

When the eighth transistor M8 is turned on, the second power supply VSS may be supplied to the first node N1, so that the fourth transistor M4 and the fifth transistor M5 may be turned on. When the fifth transistor M5 is turned on, the voltage of the first power supply VDD may be supplied to the output terminal 1004. Subsequently, the fourth transistor M4 and the fifth transistor M5 may maintain the turn-on state in response to the voltage charged in the second capacitor C2, so that output terminal 1004 may stably receive the voltage of the first power supply VDD.

In addition, when the second clock signal CLK2 is supplied, the third transistor M3 may be turned on. Since the fourth transistor M4 is set to the turn-on state, the voltage of the first power supply VDD may be supplied to the third node N3 and the second nod N2. The sixth transistor M6 and the seventh transistor M7 may stably maintain the turn-off state.

The second scan stage SST2 may receive an output signal (e.g., a scan signal) from the first scan stage SST1 to be synchronized with the second clock signal CLK2. The second scan stage SST2 may output a scan signal to the second scan line S12 to be synchronized with the first clock signal CLK1. As can be seen, the scan stages SST of the present invention may repeat the above-described operations and sequentially output scan signals to the scan lines.

According to an exemplary embodiment of the present invention, the first transistor M1 may limit the minimum voltage width of the third node N3 regardless of the voltage of the second node N2, so that manufacturing costs and driving reliability may be ensured.

For example, when a scan signal is supplied to the output terminal 1004, the voltage of the second node N2 may be lowered to a voltage of approximately VSS−(VDD−VSS). When it is assumed that the first power supply VDD is 7V and the second power supply VSS is −8V, the voltage of the second node N2 may be lowered to approximately −20V despite threshold voltages of the transistors.

When the first transistor is removed, Vds of the second transistor M2 and Vgs of the seventh transistor M7 may be set to approximately −27V. Therefore, components having a high internal pressure may be used as the second transistor M2 and the seventh transistor M7. In addition, when a high voltage is applied to the second transistor 2 and the seventh transistor M7, a large amount of power may be consumed and driving reliability may be lowered. However, according to an exemplary embodiment of the present invention, when the first transistor M1 is added between the third node N3 and the second node N2, the voltage of the third node N3 may be maintained at a voltage of approximately the second power supply VSS. As a result, Vds of the second transistor M2 and Vgs of the seventh transistor M7 may be set to approximately −14V.

Figure 8:
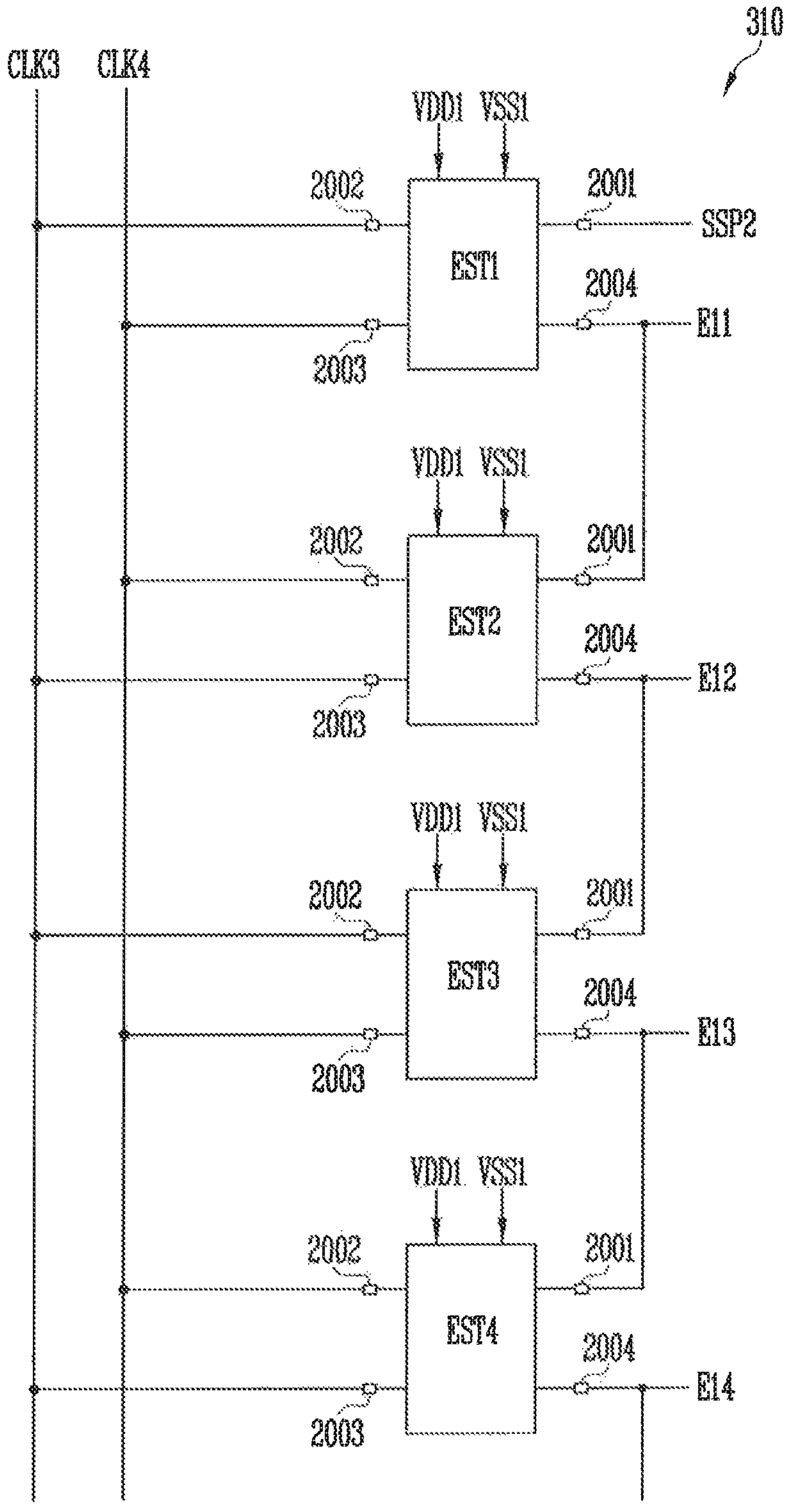
FIG. 8 is a diagram illustrating a scan driver according to an exemplary embodiment of the present invention.

Scan stages may also be provided in the second peripheral area as NA2 well as the first peripheral area NA1. The scan stages provided in the second peripheral area NA1 may be configured in substantially the same manner and drive by substantially the same driving method as the above-described scan stages FIG. 8 is a diagram illustrating a light emitting driver according to an exemplary embodiment of the present invention. For convenience of explanation, FIG. 8 illustrates four light emitting stages.

Referring to FIG. 8, the light emitting driver 310 according to an exemplary embodiment of the present invention may include a plurality of light emitting stages EST1 to EST4. Each of the light emitting stages EST1 to EST4 may be coupled to one of the first light emission control lines E11 to E14 and be driven by third and fourth clock signals CLK3 and CLK4. The light emitting stages EST1 to EST4 may be realized with the same circuit configurations as each other.

Each of the light emitting stages EST1 to EST4 may include first to third input terminals 2001 to 2003 and an output terminal 2004.

The first input terminal 2001 of each of the light emitting stages EST1 to EST4 may receive an output signal (e.g., a light emission control signal) from a previous light emitting stage, or a second start pulse SSP2. For example, the first input terminal 2001 of the first light emitting stage EST1 may receive the second start pulse SSP2 and the first input terminal 2001 of each of the remaining light emitting stages EST2 to EST4 may receive an output signal of a previous stage.

The second input terminal 2002 of a jth light emitting stage may receive the third clock signal CLK3, and the third input terminal 2003 of the jth light emitting stage ESTj may receive the fourth clock signal CLK4. The second input terminal 2002 of a (j+1)th light emitting stage ESTj+1 may receive the fourth clock signal CLK4, and the third input terminal 2003 of the (j+1)th light emitting stage ESTj+1 may receive the third clock signal CLK3.

The third clock signal CLK3 and the fourth clock signal CLK4 may have the same period and phases as each other may not overlap with each other. For example, the clock signals CLK3 and CLK4 may each have a period of 2H and be supplied during different horizontal periods.

In addition, each of the light emitting stages EST1 to EST4 may receive a third power supply VDD1 and a fourth power supply VSS1. The third power supply VDD1 may be set as a gate off voltage and the fourth power supply VSS1 may be set as a gate on voltage. In addition, the third power supply VDD1 may be set to the same voltage as the first power supply VDD, and the fourth power supply VSS1 may be set to the same voltage as the second power supply VSS.

Figure 9:
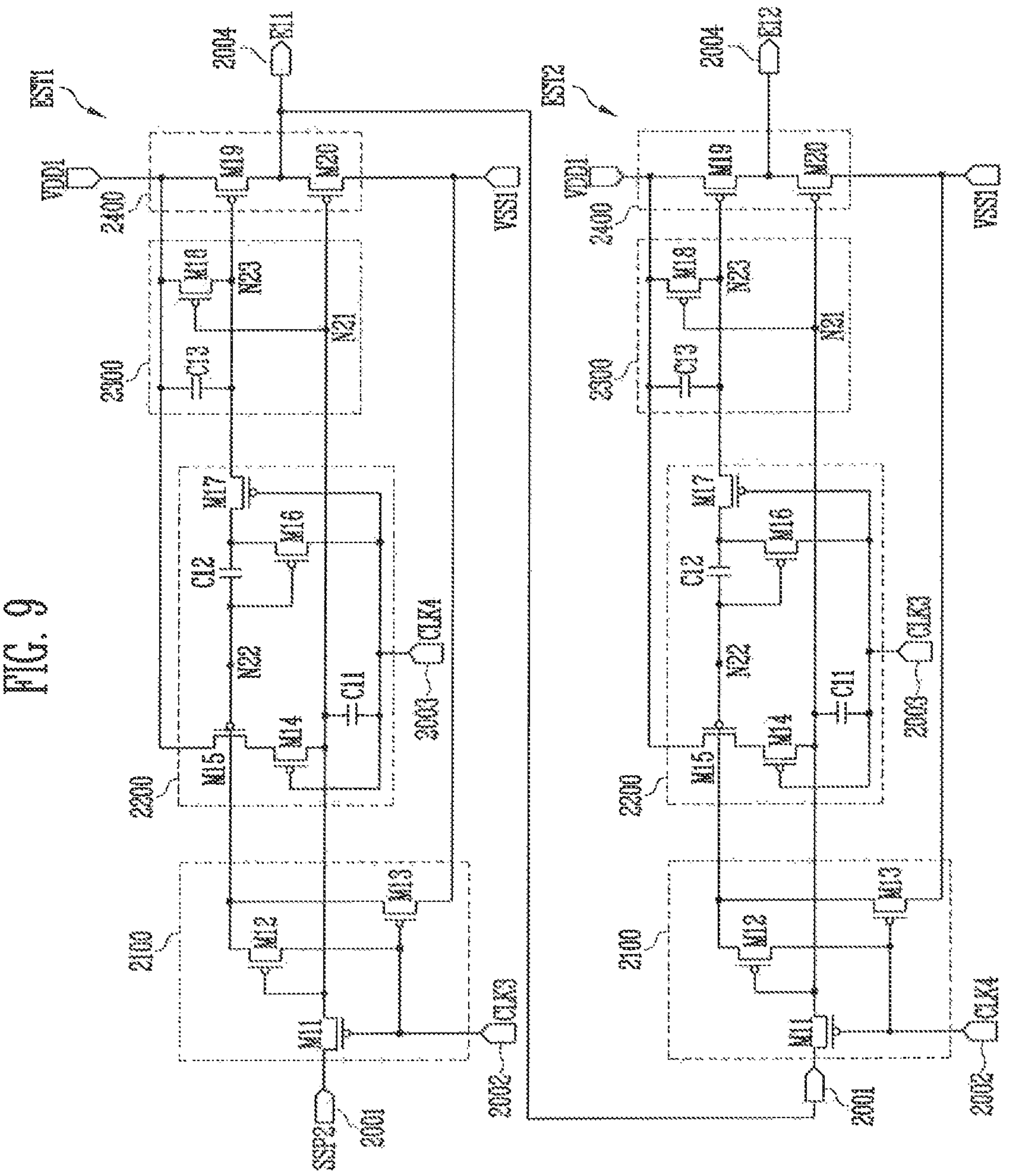
FIG. 9 is a circuit diagram illustrating a light emission stage shown in FIG. 8 according to an exemplary embodiment of the present invention.

FIG. 9 is a circuit diagram illustrating a light emitting stage shown in FIG. 8 according to an exemplary embodiment of the present invention. For convenience of explanation, FIG. 9 illustrates the first light emitting stage EST1 and the second light emitting stage EST2.

Referring to FIG. 9, the first light emitting stage EST1 may include a first signal processor 2100, a second signal processor 2200, a third signal processor 2300, and an output unit 2400 (or buffer).

The first signal processor 2100 may control voltages of a twenty-second node N22 and a twenty-first node N21 in response to signals supplied to the first input terminal 2001 and the second input terminal 2002. The first signal processor 2100 may include an eleventh transistor M11, a twelfth transistor M12, and a thirteenth transistor M13.

The eleventh transistor M11 may be located between the first input terminal 2001 and the twenty-first node N21 and a gate electrode of the eleventh transistor M11 may be coupled to the second input terminal 2002. The eleventh transistor M11 may be turned on when the third clock signal CLK3 is supplied to the second input terminal 2002.

The twelfth transistor M12 may be located between the second input terminal 2002 and the twenty-second node N22 and a gate electrode of the twelfth transistor M12 may be coupled to the twenty-first node N21. The twelfth transistor M12 may be turned on or off in response to a voltage of the twenty-first node N21.

The thirteenth transistor M13 may be located between the fourth power supply VSS1 and the twenty-second node N22 and a gate electrode of the thirteenth transistor M13 may be coupled to the second input terminal 2002. The thirteenth transistor 13 may be turned on when the third clock signal CLK3 is supplied to the second input terminal 2002.

The second signal processor 2200 may control voltages of the twenty-first node N21 and a twenty-third node N23 in response to the signals supplied to the third input terminal 2003 and a voltage of the twenty-second node N22. The second signal processor 2200 may include fourteenth to seventeenth transistors M14 to M17, an eleventh capacitor C11, and a twelfth capacitor C12.

The fourteenth transistor M14 may be located between the fifteenth transistor M15 and the twenty-first node N21 and a gate electrode of the fourteenth transistor M14 may be coupled to the third input terminal 2003. The fourteenth transistor M14 may be turned on when the fourth clock signal CLK4 is supplied to the third input terminal 2003.

The fifteenth transistor M15 may be located between the third power supply VDD1 and the fourteenth transistor M14 and a gate electrode of the fifteenth transistor M15 may be coupled to the twenty-second node N22. The fifteenth transistor M15 may be turned on or off in response to the voltage of the twenty-second node N22.

The sixteenth transistor M16 may be located between a first electrode of seventeenth transistor M17 and the third input terminal 2003 and a gate electrode of the sixteenth transistor M16 may be coupled to the twenty-second node N22. The sixteenth transistor M16 may be turned on or off in response to the voltage of the twenty-second node N22.

The seventeenth transistor M17 may be located between a first electrode of the sixteenth transistor M16 and the twenty-third node N23 and a gate electrode of the seventeenth transistor M17 may be coupled to the third input terminal 2003. The seventeenth transistor M17 may be turned on when the fourth clock signal CLK4 is supplied to the third input terminal 2003.

The eleventh capacitor C11 may be coupled between the twenty-first node N21 and the third input terminal 2003.

The twelfth capacitor C12 may be coupled between the twenty-second node N22 and the first electrode of the seventeenth transistor M17.

The third signal processor 2300 may control a voltage of the twenty-third node N23 in response to the voltage of the twenty-first node N21. The third signal processor 2300 may include an eighteenth transistor M18 and a thirteenth capacitor C13.

The eighteenth transistor M18 may be located between the third power supply VDD1 and the twenty-third node N23 and a gate electrode of the eighteenth transistor M18 may be coupled to the twenty-first node N21. The eighteenth transistor M18 may be turned on or off in response to the voltage of the twenty-first node N21.

The thirteenth capacitor C13 may be located between the third power supply VDD1 and the twenty-third node N23.

The output unit 2400 may control a voltage supplied to the output terminal 2004 in response to the voltages of the twenty-first node N21 and the twenty-third node N23. The output unit 2400 may include a nineteenth transistor M19 and a twentieth transistor M20.

The nineteenth transistor M19 may be located between the third power supply VDD1 and the output terminal 2004 and a gate electrode of the nineteenth transistor M19 may be coupled to the twenty-third node N23. The nineteenth transistor M19 may be turned on or off in response to the voltage of the twenty-third node N23.

The twentieth transistor M20 may be located between the output terminal 2004 and the fourth power supply VSS1 and a gate electrode of the twentieth transistor M20 may be coupled to the twenty-first node N21. The twentieth transistor M20 may be turned on or off in response to the voltage of the twenty-first node N21. The output unit 2400 may be driven as a buffer. In addition, the nineteenth transistor M19 and/or the twentieth transistor M20 may be composed of a plurality of transistors connected in parallel.

Figure 10:
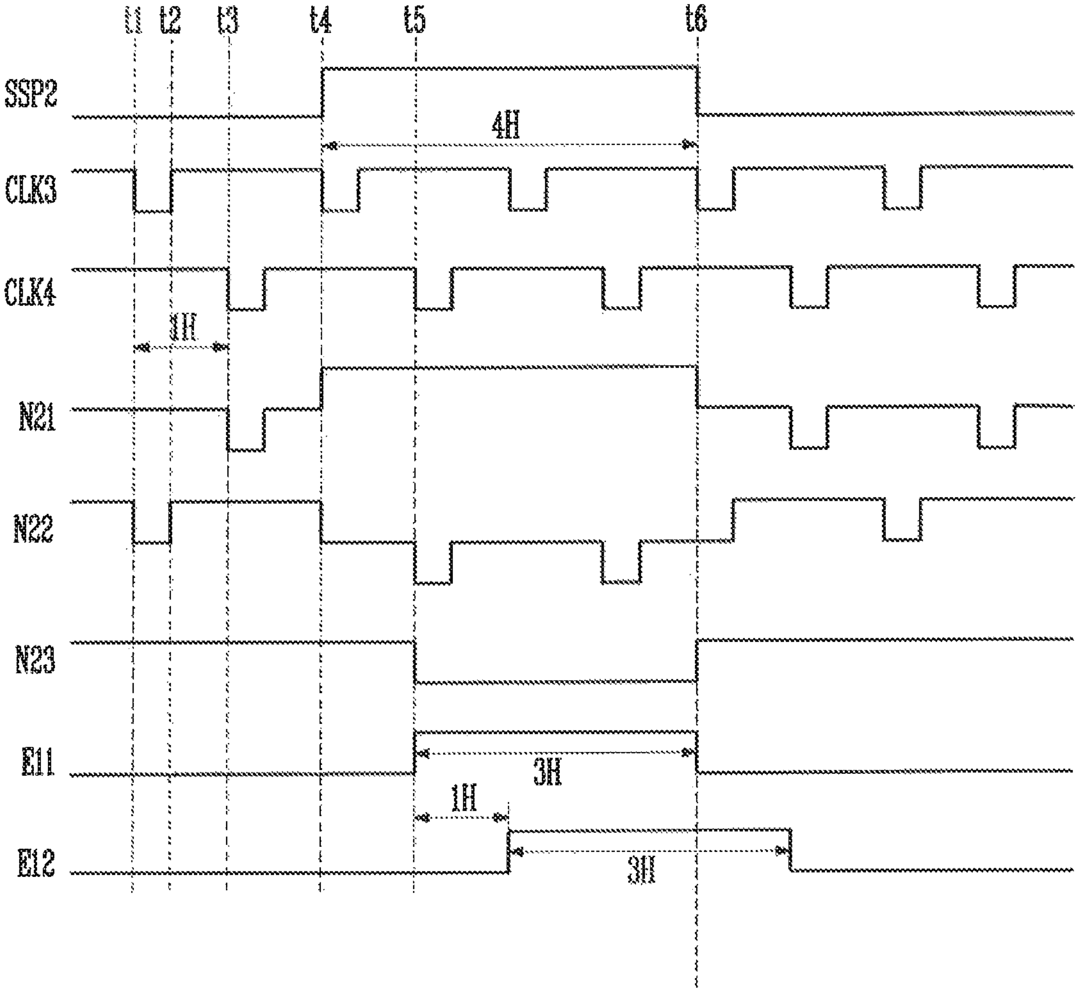
FIG. 10 is a waveform diagram illustrating a method of driving a light emission stage shown in FIG. 9 according to an exemplary embodiment of the present invention.

FIG. 10 is a waveform diagram illustrating a method of driving light emitting stages shown in FIG. 9 according to an exemplary embodiment of the present invention. For convenience of explanation, FIG. 10 illustrates operations using the first light emitting stage EST1.

Referring to FIG. 10, the third clock signal CLK3 and the fourth clock signal CLK4 may each have two horizontal periods 2H and be supplied during different horizontal periods. In other words, the fourth clock signal CLK4 may be set to a signal shifted by a half period (e.g., a single horizontal period 1H) from the third clock signal CLK3.

When the second start pulse SSP2 is supplied, the first input terminal 2001 may be set to a voltage of the third power supply VDD1. When the second start pulse SSP2 is not supplied, the first input terminal 2001 may be set to a voltage of the fourth power supply VSS1. In addition, when the clock signal CLK is supplied to the second input terminal 2002 and the third input terminal 2003, the second input terminal 2002 and the third input terminal 2003 may be set to the voltage of the fourth power supply VSS1. When the clock signal CLK is not supplied to the second input terminal 2002 and the third input terminal 2003, the second input terminal 2002 and the third input terminal 2003 may be set to the voltage of the third power supply VDD1.

The second start pulse SSP2 supplied to the first input terminal 2001 may be supplied in synchronization with the clock signal supplied to the second input terminal 2002, e.g., the third clock signal CLK3. In addition, the second start pulse SSP2 may be set to have a greater width than the third clock signal CLK3. For example, the second start pulse SSP2 may be supplied during four horizontal periods 4H.

For example, the third clock signal CLK3 may be supplied to the second input terminal 2002 duffing a first time t1. When the third clock signal CLK3 is supplied to the second input terminal 2002, the eleventh transistor M11 and the thirteenth transistor M13 may be turned on.

When the eleventh transistor M11 is turned on, the first input terminal 2001 and the twenty-first node N21 may be electrically connected to each other. Since the second start pulse SSP2 is not supplied to the first input terminal 2001, a low voltage may be supplied to the twenty-first node N21.

When a low voltage is supplied to the twenty-first node N21, the twelfth transistor M12, the eighteenth transistor M18 and the twentieth transistor M20 may be turned on.

When the eighteenth transistor M18 is turned on, the third power supply VDD1 may be supplied to the twenty-third node N23, so that the nineteenth transistor M19 may be turned off. The thirteenth capacitor C13 may be charged with a voltage corresponding to the third power supply WDD1, so that the nineteenth transistor M19 may stably maintain the turn-off state after the first time t1.

When the twentieth transistor M20 is turned on, the voltage of the fourth power supply VSS1 may be supplied to the output terminal 2004. Therefore, during the first time t1, a light emission control signal may not be supplied to the first light emission control line E11.

When the twelfth transistor M12 is turned on, the third clock signal CLK3 may be supplied to the twenty-second node N22. In addition, when the thirteenth transistor M13 is turned on, the voltage of the fourth power supply VSS1 may be supplied to the twenty-second node N22. The third clock signal CLK3 may be set to the voltage of the fourth power supply VSS1, so that the twenty-second node N22 may be stably set to the voltage of the fourth power supply VSS1. When the voltage of the twenty-second node N22 is set to the fourth power supply VSS1, the seventeenth transistor M17 may be set to a turn-off state. Therefore, the twenty-third node N23 may maintain a voltage of the third power supply VDD1 regardless of the voltage of the twenty-second node N22.

The supply of the third clock signal CLK3 to the second input terminal 2002 may be stopped during a second time t2. When the supply of the third clock signal CLK3 is stopped, the eleventh transistor M11 and the thirteenth transistor M13 may be turned off. The voltage of the twenty-first node N21 may be maintained at a low voltage by the eleventh capacitor C11, so that the twelfth transistor M12, the eighteenth transistor M18, and the twentieth transistor M20 may maintain the turn-on state.

When the twelfth transistor M12 is turned on, the second input terminal 2002 and the twenty-second node N22 may be electrically connected to each other. The twenty-second node N22 may be set to a high voltage.

When the eighteenth transistor M18 is turned on, a voltage of the third power supply VDD may be supplied to the twenty-third node N23, so that the nineteenth transistor 9 may maintain the turn-off state.

When the twentieth transistor M20 is turned on, the voltage of the fourth power supply VSS1 may be supplied to the output terminal 2004.

The fourth clock signal CLK4 may be supplied to the third input terminal 2003 during a third time t3. When the fourth clock signal CLK4 is supplied to the third input terminal 2003, the fourteenth transistor M14 and the seventeenth transistor M17 may be turned on.

When the seventeenth transistor M17 is turned on, the twelfth capacitor C12 and the twenty-third node N23 may be electrically connected to each other. The twenty-third node N23 may maintain the voltage of the third power supply VDD1. In addition, when the fourteenth transistor M14 is turned on, the fifteenth transistor M15 may be set to a turn-off state. Therefore, when the fourteenth transistor M14 is turned on, the voltage of the twenty-first node N21 may not be changed.

When the fourth clock signal CLK4 is supplied to the third input terminal 2003, the twenty-first node N21 may be reduced to a smaller voltage than the fourth power supply VSS1 by coupling of the eleventh capacitor C11. When the voltage of the twenty-first node N21 is lowered to the smaller voltage than the fourth power supply VSS1, driving characteristics of the eighteenth transistor M18 and the twentieth transistor M20 may be increased since, e.g., a PMOS transistor has better driving characteristics when receiving a lower voltage level.

During a fourth time t4, the second start pulse SSP2 may be supplied to the first input terminal 2001 and the third clock signal CLK3 may be supplied to the second input terminal 2002.

When the third clock signal CLK3 is supplied to the second input terminal 2002, the eleventh transistor M11 and the thirteenth transistor M13 may be turned on. When the eleventh transistor M11 is turned on, the first input terminal 2001 and the twenty-first node N21 may be electrically connected to each other. Since the second start pulse SSP2 is supplied to the first input terminal 2001, a high voltage may be supplied to the twenty-first node N21. When the high voltage is supplied to the twenty-first node N21, the twelfth transistor M12, the eighteenth transistor M18 and the twentieth transistor M20 may be turned off.

When the thirteenth transistor M13 is turned on, the voltage of the fourth power supply VSS1 may be supplied to the twenty-second node N22. Since the fourteenth transistor M14 is set to the turn-off state, the twenty-first node N21 may maintain the high voltage. In addition, since the seventeenth transistor M17 is set to the turn-off state, the voltage of the twenty-third node N23 may maintain the high voltage of the thirteenth capacitor C13. Therefore, the nineteenth transistor M19 may maintain the turn-off state.

The fourth clock signal CLK4 may be supplied to the third input terminal 2003 during a fifth time t5. When the fourth clock signal CLK4 is supplied to the third input terminal 2003, the fourteenth transistor M14 and the seventeenth transistor M17 may be turned on. In addition, since the twenty-second node N22 is set to the voltage of the fourth power supply VSS1, the fifteenth transistor M15 and the sixteenth transistor M16 may be turned on.

When the sixteenth transistor M16 and the seventeenth transistor M17 are turned on, the fourth clock signal CLK4 may be supplied to the twenty-third node N23. When the fourth clock signal CLK4 is supplied to the twenty-third node N23, the nineteenth transistor M19 may be turned on. When the nineteenth transistor M19 is turned on, the voltage of the third power supply VDD1 may be supplied to the output terminal 2004. The voltage of the third power supply VDD1 supplied to the output terminal 2004 may be supplied as a light emission control signal to the first light emission control line E11.

When a voltage of the fourth clock signal CLK4 is supplied to the twenty-third node N23, the voltage of the twenty-second node N22 may be lowered to a smaller voltage than the fourth power supply VSS1 by coupling of the twelfth capacitor C12, so that driving characteristics of the transistors coupled to the twenty-second node N22 may be increased.

When the fourteenth transistor M14 and the fifteenth transistor M15 are turned on, the voltage of the third power supply VDD1 may be supplied to the twenty-first node N21. When the voltage of the third power supply VDD1 is supplied to the twenty-first node N21, the twentieth transistor M20 may maintain the turn-off state. Therefore, the voltage of the third power supply VDD1 may be stably supplied to the first light emission control line E11.

The third clock signal CLK3 may be supplied to the second input terminal 2002 during a sixth time t6. When the third clock signal CLK3 is supplied to the second input terminal 2002, the eleventh transistor and the thirteenth transistor M13 may be turned on.

When the eleventh transistor M11 is turned on, the twenty-first node N21 and the first input terminal 2001 may be electrically connected to each other, so that the twenty-first node N21 may be set to a low voltage. When the twenty-first node N21 is set to the low voltage, the eighteenth transistor M18 and the twentieth transistor M20 may be turned on.

When the eighteenth transistor M18 is turned on, the voltage of the third power supply VDD1 may be supplied to the twenty-third node N23, so that the nineteenth transistor M19 may be turned off. When the twentieth transistor M20 is turned on, the voltage of the fourth power supply VSS1 may be supplied to the output terminal 2004. The voltage of the fourth power supply VSS1 supplied to the output terminal 2004 may be supplied to the first light emission control line E11, so that the supply of the light emission control signal may be stopped.

As can be seen, the light emitting stages EST according to an exemplary embodiment of the present invention may repeat the above-described processes to sequentially output light emission control signals to light emission control lines.

In addition, for convenience of explanation, transistors are illustrated as PMOS transistors. However, the present invention may not be limited thereto. In other words, the transistors may be NMOS transistors.

Light emitting stages may also be provided in the second peripheral area NA2 as well as the first peripheral area NA1. The light emitting stages provided in the second peripheral area NA2 may have the same configuration as the above-described light emitting stages and be operated by the same driving method. In addition, the first light emitting stage in the second peripheral area NA2 may operate upon receiving an output signal from the last light emitting stage provided in the first peripheral area NA1.

In an exemplary embodiment of the present invention, the organic light emitting diode OLED may generate light of various colors including red, green and blue in response to the amount of current supplied from the driving transistor. However, the present invention is not limited thereto. For example, the organic light emitting diode OLED may generate white light in response to the amount of current supplied from the driving transistor. A color image may be displayed using a separate color filter.

Figure 11:
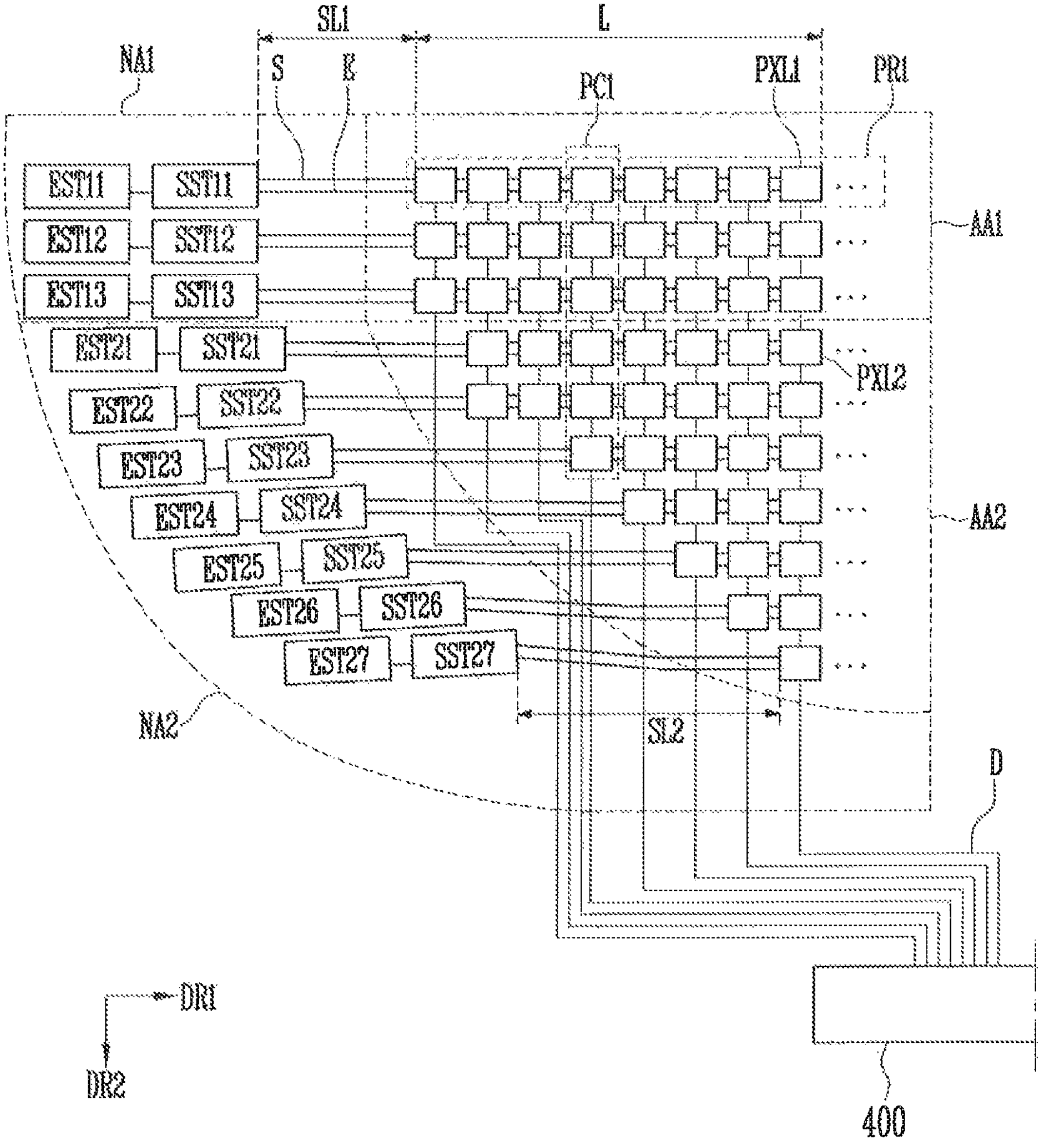
FIG. 11 is an enlarged view of an area A of an organic light emitting display device shown in FIG. 2 according to an exemplary embodiment of the present invention.

FIG. 11 is an enlarged diagram of a region A of an organic light-emitting display device shown in FIG. 2 according to an exemplary embodiment of the present invention.

The region A illustrated in FIG. 2 may include some of the lower part of the first pixel area AA1 and some of the corner portion of the second pixel area AA2. In addition, the region A may include a portion of the first peripheral area NA1 and a portion of the second peripheral area NA2.

Referring to FIG. 11, the pixels PXL1 and PXL2 provided in the region A may include a plurality of pixel rows PR1 in which each of the pixels may extend in a first direction DR1. Each of the pixel rows PR1 may be arranged in a second direction DR2.

In addition, pixel columns PC1 may be formed such that each of the pixels PXL1 and PXL2 may extend in the second direction DR2. Each of the pixel columns PC1 may be arranged in the first direction DR1. In other words, the pixels PXL1 and PXL2 may be arranged in a matrix format.

The first pixel area AA1 may have a rectangular shape. For example, when an axis in parallel with the first direction DR1 is an x axis, outermost pixels of the respective pixel rows PR1 may have the same x-axis position, each pixel row PR1 may have the same number of pixels, and each pixel row PR1 may have the same length in the first direction DR1.

For the corner portion of the second pixel area AA2 to have a curved shape, the pixel row PR1 closer to the first pixel area AA1 may have a larger number of pixels PXL2, and the pixel row PR1 closer to a lower part of the second pixel area AA2 may include a smaller number of second pixels PXL2.

For example, when the x-axis position of the leftmost pixel of the pixel row PR1 in the first pixel area AA1 is used as a reference position, the x-axis position of the rightmost pixel may be more distant from the reference position as the pixel row PR1 in the second pixel area AA2 advances in the second direction DR2, and the number of pixels PXL2 constituting the pixel row PR1 may gradually decrease. In other words, as the pixel row PR1 advances in the second direction DR2, a length L of the pixel row PR1 in the first direction DR1 may gradually decrease, so that the corner portion of the second pixel area AA2 may have a curved shape.

FIG. 11 illustrates the second pixels PXL2 arranged in seven rows. However, the present invention is not limited thereto. The number of pixel rows PR1 forming the second pixel area AA2 may vary.

In addition, for convenience of explanation, only the left sides of the first and second pixel areas AA1 and AA2 are illustrated. However, the left and right sides of the first and second pixel areas AA1 and AA2 may be symmetrical with respect to each other.

In addition, the lengths of the pixel rows PR1 arranged in the second pixel area AA2 may gradually decrease as the pixel rows PR1 go down in the second direction DR2. However, the lengths are not necessarily reduced at the same rate (or the numbers of pixels PXL2 arranged in the pixel rows PR1 are not necessarily reduced at the same rate). The number of pixels PXL2 arranged in each pixel row PR1 may vary depending on the curvature of a curved line defining the corner portion of the second pixel area AA2.

The first peripheral area NA1 and the second peripheral area NA2 may include first scan stages SST11 to SST13 and second scan stages SST21 to SST27, respectively.

Each of the first scan stages SST11 to SST13 may correspond to each of the pixel rows PR1 included in the first pixel area AA1 and supply scan signals to the first pixels PXL1 arranged in a corresponding pixel row.

When a scan line S connecting an output terminal of each of the first scan stages SST11 to SST13 to a scan signal input terminal of the outermost pixel of the pixel row PR1 has a length SL1, the scan lines S included in the first pixel area AA1 may have the same length SL1. Here, a scan signal input terminal of a pixel may be included in a pixel circuit and refer to a gate electrode (e.g., the gate electrode of the transistor T2 shown in FIG. 4) of a predetermined transistor driven by a scan signal supplied through the scan line S.

The scan lines S provided in the first pixel area AA1 may be in parallel with the first direction DR1. In other words, the output terminal of each of the first scan stages SST11 to SST13 and the scan signal input terminal of the outermost pixel in the pixel row PR1 may have the same position in the second direction DR2.

Each of first light emitting stages EST11 to EST13 may be provided at one side of each of the first scan stages SST11 to SST13. Each of the first light emitting stages EST11 to EST13 may correspond to each of the pixel rows PR1 provided in the first pixel area AA1 and supply light emission control signals to the first pixels PXL1 arranged in the corresponding pixel row. Subsequently, the second scan stages SST21 to SST27 may be arranged in a curved shape to correspond to the shape of the corner of the second peripheral area NA2. For example, some or all lines connecting the respective output terminals of the second scan stages SST21 to SST27 may be curved lines having predetermined curvatures.

When the scan line S connecting the output terminal of each of the second scan stages SST21 to SST27 to the input terminal of the outermost pixel of the pixel row PR1 corresponding thereto has a length SL2, the length SL2 of each of the scan lines S included in the second pixel area AA2 may be greater than the length SL1 of each of the scan lines S included in the first pixel area AA1.

In addition, regarding the scan lines S included in the second pixel area AA2, the length SL2 of the scan line S closer to the first pixel area AA1 may be smaller and the length SL2 of the scan line S closer to the lower part of the second pixel area AA2 may be greater.

In addition, the scan lines provided in the second pixel area AA2 may be formed at a predetermined angle (greater than zero degrees) with respect to the first direction DR1. In other words, the output terminal of each of the second scan stages SST21 to SST27 and the scan signal input terminal of the outermost pixel in the pixel row PR1 may have different positions in the second direction DR2, so that the scan line S may be connected at a predetermined slope.

When an axis parallel to the second direction DR2 is a y axis, a y-axis output position of at least one of the second scan stages SST21 to SST27 may be arranged to be higher than a y-axis position of the scan signal input terminal of the second pixel PXL2 connected through the scan line S.

When the y-axis output position of each of the second scan stages SST21 to SST27 is located above the y-axis position of the scan signal input terminal of the second pixel PXL2 connected through the scan line S, a portion of each of the second scan stages SST21 to SST27 may be located below the y-axis position of the scan signal input terminal of the second pixel PXL2 corresponding thereto.

In addition, the y-axis output position of at least one of the second scan stages SST21 to SST27 may be lower than the y-axis position of the scan signal input terminal of the second pixel PXL2 connected through the scan line S. When the y-axis output position of each of the second scan stages SST21 to SST27 is lower than the y-axis position of the scan signal input terminal of the second pixel PXL2 corresponding thereto, a portion of each of the second scan stages SST21 to SST27 may be higher than the y-axis position of the scan signal input terminal of the second pixel PXL2 corresponding thereto.

As described above, the scan signal input terminal of the pixel PXL1 or PXL2 may be provided in a pixel circuit and refer to a gate electrode (e.g., a gate electrode of the transistor T4 shown in FIG. 4) of a predetermined transistor driven by a scan signal supplied through the scan line S.

The scan lines S included in the second pixel area AA2 may have linear shapes having the same slope between the output terminals of the second scan stages SST21 to SST27 to the input terminals of the outermost pixels of the pixel rows PR1. However, the present invention is not limited thereto. In other words, as illustrated in FIG. 11, each of the scan lines S may be curved at a predetermined position.

Each of the second light emitting stages EST21 to EST27 may be provided at one side of each of the second scan stages SST21 to SST27. The second light emitting stages EST21 to EST27 may be arranged in a curved shape to correspond to the second peripheral area NA2. For example, some or all lines connecting the respective output terminals of the second light emitting stages EST21 to EST27 may be curved lines having predetermined curvatures.

Each of the second light emitting stages EST21 to EST27 may correspond to each of the pixel rows PR1 provided in the second pixel area AA2 and supply light emission control signals to the second pixels PXL2 arranged in the corresponding pixel row PR1.

The data driver 400 may be provided at another side of the second pixel area AA2. For example, away from the curved side of the second pixel area AA2. A corresponding data line D may be connected to each of the pixel columns PC1. For example, the same data line D may be connected to the first pixels PXL1 and the second pixels PXL2 arranged in the same pixel columns PC1.

As illustrated in FIG. 11, the scan lines S may be connected in the first direction DR1 and the data lines D may be connected in the second direction DR2. Thus, when viewed in a plane, overlapping portions may exist between the scan lines S and the data lines D.

The pixel row PR1 closer to the lower part of the second pixel area AA2 may include a smaller number of pixels PXL2 so that the corner portion of the second pixel area AA2 may be curved. Therefore, the number of data lines D passing through the sides of the second pixels PXL2 may increase toward the lower part of the second pixel area AA2. As a result, more overlapping may occur between the scan line S and the data line D in the pixel row PR1 closer to the lower part of the second pixel area AA2.

For convenience of explanation, FIG. 11 illustrates the structures of the second pixels PXL2 and the second scan stages SST21 to SST27 arranged in the second pixel area AA2 and the second peripheral area NA2 in detail. However, the arrangements of the components illustrated in FIG. 11 may be applicable to other components. For example, when another portion of the substrate 100 in addition to the lower corner portion thereof is curved, the above-described configurations of the pixels, scan lines, the light emission control lines, the scan stages and the light emitting stages may be applicable to the corresponding portion.

Figure 12:
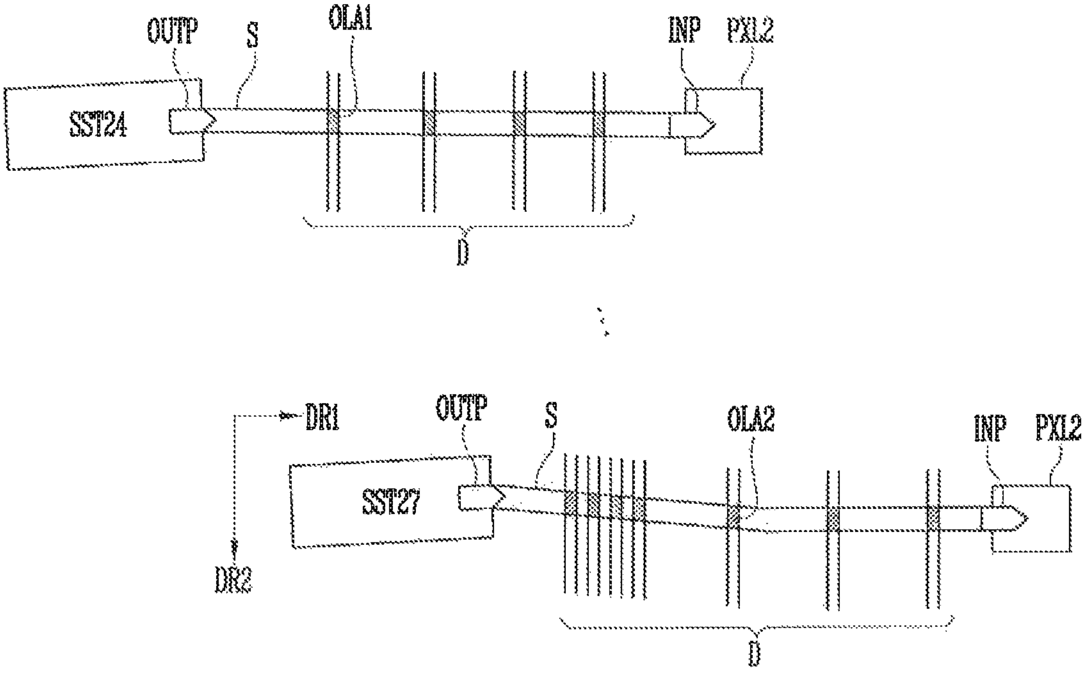
FIG. 12 is an enlarged view of portions of components of an organic light emitting device shown in FIG. 11 which are located in a second pixel area and a second peripheral area according to an exemplary embodiment of the present invention.

FIG. 12 is an enlarged view of some of the components of an organic light-emitting display device shown in FIG. 11 which are located in a second pixel area and a second peripheral area according to an exemplary embodiment of the present invention.

FIG. 12 shows the second scan stage SST24 and the second scan stage SST27, among the second scan stages SST21 to SST27, the scan lines S coupled to the second scan stages SST24 and SST27, the second pixels PXL2 coupled to the scan lines S, and the data lines D overlapping the scan lines S when viewed in the plane. These components may be included in the second pixel area AA2 and the second peripheral area NA2.

As illustrated in FIG. 12, first overlapping areas OLA1 may be formed between the scan line S connected to the second scan stage SST24 and the data lines D, and second overlapping areas OLA2 may be formed between the scan line S connected to the second scan stage SST27 and the data lines D.

Each of the second scan stages SST24 and SST27 may include an output terminal OUTP through which a scan signal is output to the scan line S. The second pixel PXL2 may include an input terminal INP to receive the scan signal through the scan line S.

In addition to the second scan stage SST27 illustrated in FIG. 12, all scan stages and light emitting stages included in an organic light-emitting display device according to an exemplary embodiment of the present invention may include the output terminals OUTP. In addition, each of the pixels may include the input terminal INP.

Referring to FIG. 12, when an axis in parallel with the second direction DR2 is a y axis, a y-axis position of the output terminal OUTP of the second scan stage SST27 may be different from a y-axis position of the input terminal MP of the second pixel PXL2 coupled to the second scan stage SST27. Therefore, the scan line S connecting the output terminal MAT of the second scan stage SST27 and the input terminal INP of the second pixel PXL2 may be inclined to have a predetermined angle (e.g., greater than zero degrees) with respect to an axis parallel to the first direction DR1. A y-axis position of the output terminal OUTP of the second scan stage SST24 may also be different from the y-axis position of the input terminal INP of the second pixel PXL2 coupled to the second scan stage SST24.

For example, when an axis in parallel with the second direction DR2 is a y axis, the y-axis output position of the output terminal OUTP of the second scan stage SST24 may be higher than the y-axis position of the input terminal INP of the second pixel PXL2.

When the y-axis output position of the output terminal OUTP of the second scan stage SST24 is higher than the y-axis position of the input terminal INP of the second pixel PXL2 connected through the scan line S, a portion of second scan stage SST24 may be lower than the y-axis position of the input terminal INP of the second pixel PXL2 corresponding thereto.

As illustrated in FIG. 12, when the y-axis position of the output terminal OUTP of the second scan stage SST27 is a reference position, the y-axis position of the input terminal INP of the second pixel PXL2 may be lower than the reference position. However, the present invention is not limited thereto. The y-axis position of the input terminal INP of the second pixel PXL2 may be higher than the reference position.

For convenience of explanation, FIG. 11 schematically illustrates the scan lines S and the data lines D in a linear shape. However, as illustrated in FIG. 12, the scan lines S and the data lines D may actually be in the shape of wiring lines having a predetermined width.

Therefore, when viewed in a plane, the overlapping areas OLA1 and OLA2 may exist between the scan line S and the data line D.

In the display device according to an exemplary embodiment of the present invention, the pixel row PR1 closer to the lower part of the second pixel area AA2 may include a smaller number of pixels PXL2 so that the corner portion of the second pixel area AA2 may have a curved shape. Therefore, the number of data lines D passing through sides of the second pixels PXL2 may increase toward the lower part of the second pixel area AA2. The number of overlapping areas OLA1 and OLA2 between the data line D and the scan line S corresponding to the pixel row PR1 closer to the lower part of the second pixel area AA2 may increase when viewed in a plane.

For example, as illustrated in FIG. 12, the number of first overlapping areas OLA1 close to the first pixel area AA1 may be smaller than the number of second overlapping areas OLA2. In addition, the increase in the number of overlapping areas may cause an increase in the sum of areas of the overlapping areas (e.g., a total area of the overlapping areas). Therefore, the sum of areas of the first overlapping areas OLA1 may be smaller than the sum of areas of the second overlapping areas OLA2.

In other words, a capacitance generated by overlapping the scan line and the data line may vary toward the lower part of the second pixel area AA2. A signal delay may be increased by increasing the capacitance. Therefore, a load deviation caused by a length difference between scan lines in the corner portion of the curved shape may be matched.

According to the present invention, a display device having a minimized dead space may be provided.

In addition, according to the present invention, a signal delay may be compensated by setting different parasitic capacitance values by overlapping a scan line and a data line depending on a particular position in a corner portion of a second pixel area.

While the present invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A display device, comprising:

a substrate including a first pixel area, a second pixel area, a first peripheral area located outside the first pixel area, and a second peripheral area located outside the second pixel area, wherein the second pixel area is located at a side of the first pixel area;

first control stages located in the first peripheral area, wherein each of output terminals of the first control stages is connected to a corresponding one of first control lines, second control stages located in the first peripheral area and located at one side of the first control stages, wherein each of output terminals of the second control stages is connected to a corresponding one of second control lines;

third control stages located in the second peripheral area, wherein each of output terminals of the third control stages is connected to a corresponding one of third control lines;

fourth control stages located in the second peripheral area and located at one side of the third control stages, wherein each of output terminals of the fourth control stages is connected to a corresponding one of fourth control lines;

first pixels located in the first pixel area, wherein input terminals of each of the first pixels in the same single pixel row are connected to both a corresponding one of the first control lines and a corresponding one of the second control lines; and second pixels located in the second pixel area, wherein input terminals of each of the second pixels in the same single pixel row are connected to both a corresponding one of the third control lines and a corresponding one of the fourth control lines, wherein the first pixels are included in a first group of pixel rows extending in a first direction, wherein the second pixels are included in a second group of pixel rows extending in the first direction, wherein at least one of the third control stages is inclined at an angle with respect to the first direction, and wherein at least one of the fourth control stages is inclined at the angle with respect to the first direction.

2. The display device of claim 1, wherein a first one of the third control lines connecting an output terminal of a first one of the third control stages and an input terminal of a first one of the second pixels is inclined with respect to the first direction.

3. The display device of claim 2, wherein a position of the output terminal of the first one of the third control stages along a second direction crossing the first direction is different from a position of the input terminal of the first one of the second pixels along the second direction.

4. The display device of claim 3, wherein a first one of the fourth control stages is connected to the first one of the second pixels.

5. The display device of claim 3, wherein a length of the first one of the third control lines is greater than a length of each of the first control lines.

6. The display device of claim 1, wherein the first control lines extend from the output terminals of the first control stages in parallel with the first direction.

7. The display device of claim 1, wherein the second peripheral area has a curved shape.

8. The display device of claim 1, wherein a number of pixels provided in pixel rows arranged in the second pixel area is smaller than a number of pixels provided in pixel rows arranged in the first pixel area.

9. The display device of claim 8, wherein pixel rows distant from the first pixel area, among the pixel rows arranged in the second pixel area, include a smaller number of pixels than pixel rows closer to the first pixel area, among the pixel rows arranged in the second pixel area.

10. The display device of claim 1, wherein the second pixel area has a smaller area than the first pixel area and a corner portion of the second pixel area has a curved shape.

* * * * *